US011954980B2

(12) United States Patent
Berman et al.

(10) Patent No.: US 11,954,980 B2
(45) Date of Patent: Apr. 9, 2024

(54) SYSTEMS, APPARATUSES AND METHODS ENHANCING GAMING OUTCOME OPPORTUNITIES

(71) Applicant: KING SHOW GAMES, INC., Minnetonka, MN (US)

(72) Inventors: Bradley Berman, Minnetonka, MN (US); Chad Shapiro, Plymouth, MN (US)

( * ) Notice: Subject to any disclaimer, the term of this patent is extended or adjusted under 35 U.S.C. 154(b) by 243 days.

(21) Appl. No.: 17/666,147

(22) Filed: Feb. 7, 2022

(65) Prior Publication Data

US 2022/0157132 A1 May 19, 2022

Related U.S. Application Data

(63) Continuation of application No. 16/505,209, filed on Jul. 8, 2019, now Pat. No. 11,244,540, which is a continuation of application No. 15/495,593, filed on Apr. 24, 2017, now Pat. No. 10,347,087, which is a continuation of application No. 14/923,425, filed on Oct. 26, 2015, now Pat. No. 9,633,514, which is a continuation of application No. 14/310,911, filed on Jun. 20, 2014, now Pat. No. 9,171,424, which is a continuation of application No. 13/798,076, filed on Mar. 12, 2013, now Pat. No. 8,771,049.

(60) Provisional application No. 61/609,932, filed on Mar. 12, 2012.

(51) Int. Cl.

| | |
|---|---|
| ***G07F 17/00*** | (2006.01) |
| ***G07F 17/32*** | (2006.01) |
| ***G07F 17/34*** | (2006.01) |

(52) U.S. Cl.

CPC .......... *G07F 17/3293* (2013.01); *G07F 17/32* (2013.01); *G07F 17/3211* (2013.01); *G07F 17/3246* (2013.01); *G07F 17/3262* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 5,118,109 | A | 6/1992 | Gumina |
| 5,356,140 | A | 10/1994 | Dabrowski et al. |
| 5,407,199 | A | 4/1995 | Gumina |

(Continued)

OTHER PUBLICATIONS

Bally Gaming & Systems, "Pick'em Poker Plus", Global Gaming Business, Jun. 2004, p. 46.

(Continued)

*Primary Examiner* — Paul A D'Agostino

(57) ABSTRACT

Embodiments of the present invention set forth systems, apparatuses and methods for providing game features. In a game of chance involving at least one outcome, a plurality of alternative outcomes can be derived for a gaming event, such as when one of the outcomes will provide a payout at or above a certain level. The player is presented with an opportunity to select among the alternative outcomes, without being aware of the particular characteristics or values associated with the outcomes. While the player will only select the outcome having the payout at/above the threshold level a certain percentage of the time, the opportunity can be presented to the player more often, while keeping the mathematical probabilities the same or similar if desired, thereby providing the player with the feeling of getting higher value opportunities more often.

18 Claims, 15 Drawing Sheets

(56) References Cited

U.S. PATENT DOCUMENTS

| | | | |
|---|---|---|---|
| 5,470,079 | A | 11/1995 | LeStrange et al. |
| 5,489,101 | A | 2/1996 | Moody |
| 5,732,950 | A | 3/1998 | Moody |
| 5,816,914 | A | 10/1998 | Wichinsky |
| 5,816,915 | A | 10/1998 | Kadlic |
| 5,816,916 | A | 10/1998 | Moody |
| 5,823,873 | A | 10/1998 | Moody |
| 6,089,976 | A | 7/2000 | Schneider et al. |
| 6,135,882 | A | 10/2000 | Kadlic |
| 6,146,271 | A | 11/2000 | Kadlic |
| 6,190,255 | B1 | 2/2001 | Thomas et al. |
| 6,322,309 | B1 | 11/2001 | Thomas et al. |
| 6,358,144 | B1 | 3/2002 | Kadlic et al. |
| 6,419,578 | B1 | 7/2002 | Moody et al. |
| 6,435,500 | B2 | 8/2002 | Gumina |
| 6,511,068 | B1 | 1/2003 | Sklansky et al. |
| 6,517,074 | B1 | 2/2003 | Moody et al. |
| 6,612,927 | B1 | 9/2003 | Slomiany et al. |
| 6,645,074 | B2 | 11/2003 | Thomas et al. |
| 6,878,060 | B2 | 4/2005 | Moody |
| 6,880,827 | B2 | 4/2005 | Stefan |
| 7,354,344 | B2 | 4/2008 | Paulsen et al. |
| 7,448,947 | B2 | 11/2008 | Englman et al. |
| 7,780,518 | B2 | 8/2010 | Yoseloff |
| 7,815,500 | B2 | 10/2010 | Montross et al. |
| 8,016,656 | B2 | 9/2011 | Berman et al. |
| 8,123,606 | B2 | 2/2012 | Hollibaugh et al. |
| 8,342,933 | B2 | 1/2013 | Berman et al. |
| 9,633,514 | B2 | 4/2017 | Berman et al. |
| 2003/0162424 | A1 | 8/2003 | Berman |
| 2004/0082378 | A1 | 4/2004 | Peterson et al. |
| 2005/0151319 | A1 | 7/2005 | Berman et al. |
| 2006/0128456 | A1 | 6/2006 | Berman et al. |
| 2006/0154714 | A1 | 7/2006 | Montross et al. |
| 2007/0135195 | A1 | 6/2007 | Albino |
| 2008/0113704 | A1 | 5/2008 | Jackson |
| 2008/0252011 | A1 | 10/2008 | Bickley et al. |
| 2012/0004022 | A1 | 1/2012 | Berman et al. |
| 2012/0149451 | A1 | 6/2012 | Nicely et al. |
| 2013/0116026 | A1 | 5/2013 | Berman et al. |
| 2014/0024427 | A1 | 1/2014 | Cole et al. |
| 2014/0287810 | A1 | 9/2014 | Berman et al. |

OTHER PUBLICATIONS

King Show Games, Inc., “Listing of Related Cases”, Feb. 17, 2022, 2 pages.

SYSTEMS, APPARATUSES AND METHODS ENHANCING GAMING OUTCOME OPPORTUNITIES

RELATED APPLICATIONS

This application is a continuation of U.S. patent application Ser. No. 16/505,209, filed Jul. 8, 2019, now U.S. Pat. No. 11,244,540, which is a continuation of U.S. patent application Ser. No. 15/495,593, filed Apr. 24, 2017, now U.S. Pat. No. 10,347,087, which is a continuation of U.S. patent application Ser. No. 14/923,425, filed Oct. 26, 2015, now U.S. Pat. No. 9,633,514, which is a continuation of U.S. patent application Ser. No. 14/310,911, filed Jun. 20, 2014, now U.S. Pat. No. 9,171,424, which is a continuation of U.S. patent application Ser. No. 13/798,076, filed Mar. 12, 2013, now U.S. Pat. No. 8,771,049, which claims the benefit of Provisional Patent Application No. 61/609,932, filed on Mar. 12, 2012, to which priority is claimed pursuant to 35 U.S.C. § 119(e), all of which are incorporated herein by reference in their entirety.

FIELD OF THE INVENTION

This disclosure relates generally to games, and more particularly to systems, apparatuses and methods for enhancing gaming outcome opportunities during game play of gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming" As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate the enhancement of gaming outcome opportunities. In one embodiment, a method of operating a gaming device includes receiving a wager to initiate a game of chance and determining a plurality of possible game outcomes. The method further includes determining if one or more of the plurality of possible game outcomes, either individually or in combination, satisfies a predefined criterion. When the predefined criterion is satisfied, the method further includes displaying a plurality of selectable indicia representing the plurality of possible game outcomes. The method further includes displaying at least one of the possible game outcomes in response to receiving a player selection of one or more of the selectable indicia. In addition, when the predefined criterion is not met, the method includes displaying a game outcome without presenting the plurality of selectable indicia.

DETAILED DESCRIPTION

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

Generally, systems, apparatuses and methods are described for enhancing winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. video poker) is provided for purposes of facilitating an understanding of the features described herein. However, the principles described herein are equally applicable to any game of chance where an outcome(s) is determined for use in the player's gaming activity. The game features described herein may be employed in stand-alone games, a primary/base games, bonus games, side bet games, etc.

Figure 1:
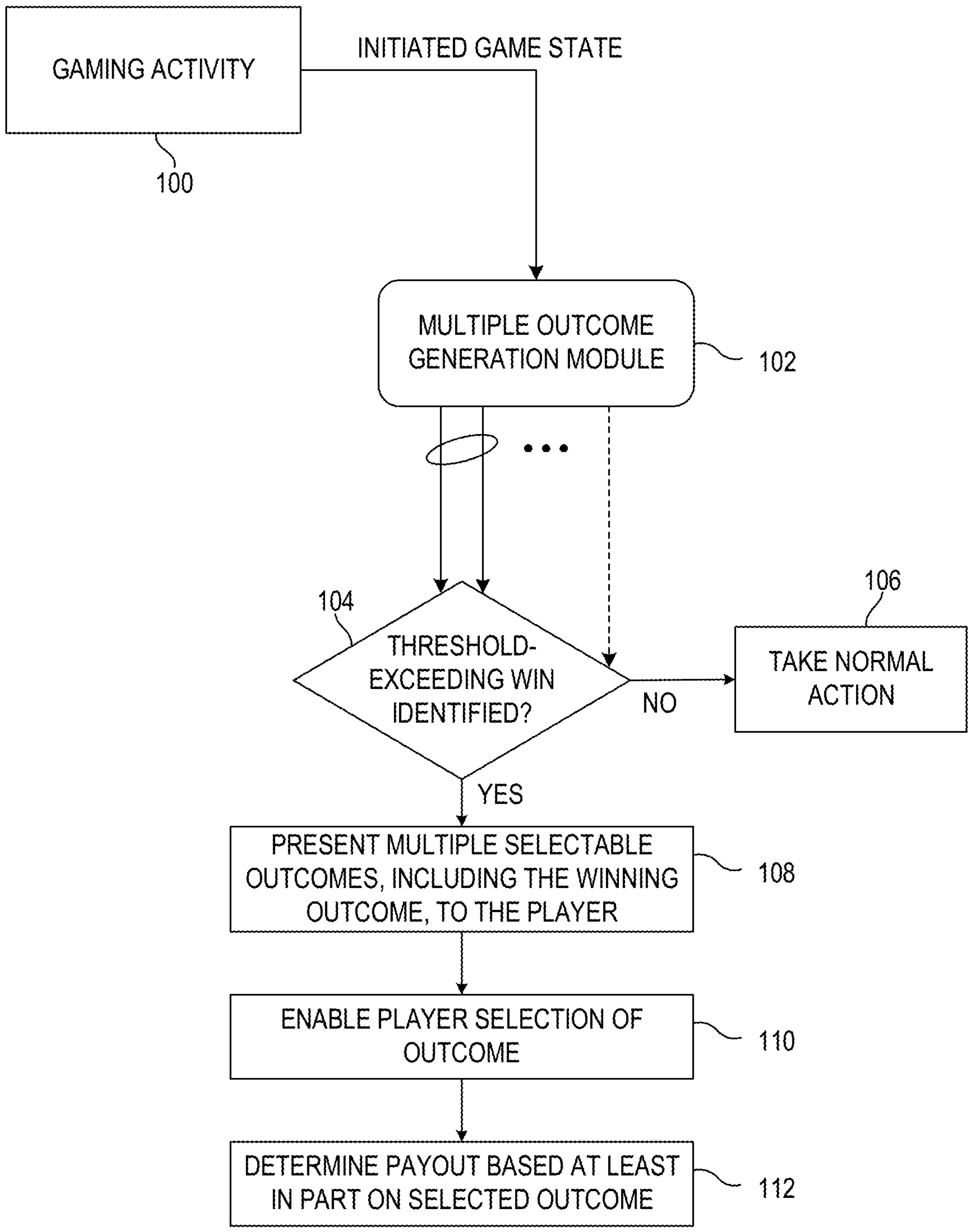
FIG. 1 is a flow diagram of a method of operating a gaming device according to embodiments of the invention.

A representative embodiment for enhancing award opportunities in connection with a gaming event is shown in FIG. 1. In this embodiment, a gaming activity 100 may be played by a player, such as playing a video poker game, slot game on a slot machine, etc. Some game state is initiated, such as a request for dealing a hand(s) of draw poker on a video draw poker machine, or a request to replace discarded cards in a hand(s) of draw poker, or a request to spin reels on a slot machine, etc. Multiple outcomes are derived by the multiple outcome generation module 102, which may be implemented via a processor executing software instructions, with or without the assistance of supporting circuitry such as random number generators (RNGs), memory, storage, etc. In one embodiment, the multiple outcomes that are generated represent alternative outcomes for the same gaming event, such as alternative initial hands dealt in a poker game, alternative initial symbol positions in a slot game, etc.

In one embodiment, it is determined 104 whether at least one of the outcomes exceeds a threshold, such as a poker rank threshold, or a poker rank that has at least a certain payout, etc. In other embodiments, a single outcome may be generated in response to the gaming event, and if it is determined that it exceeds the threshold, then at least one additional alternative outcome is generated. If multiple outcomes are not to be presented to the player as a result of the threshold not being exceeded, the normal action is taken as shown at block 106, such as presenting the original outcome, or any of the derived outcomes, to the player. If, however, the threshold is reached, the multiple generated outcomes are presented 108, including the winning outcome, to the player. In one embodiment, the outcomes are presented to the player for selection without revealing the characteristics of each option, such as presenting selectable card options "face down" or otherwise not revealing the rank or suit of the cards. The player is allowed to select at least one of the selectable outcomes as shown at block 110, and a payout(s) is determined 112 based at least in part on the outcome(s) that was selected.

The feature may be allowed to occur at all times during play of the game, such as in connection with predetermined events, at random times, in response to triggering events, in connection with other times or events established by the rules of the game, and/or based on other criteria.

Figure 2:
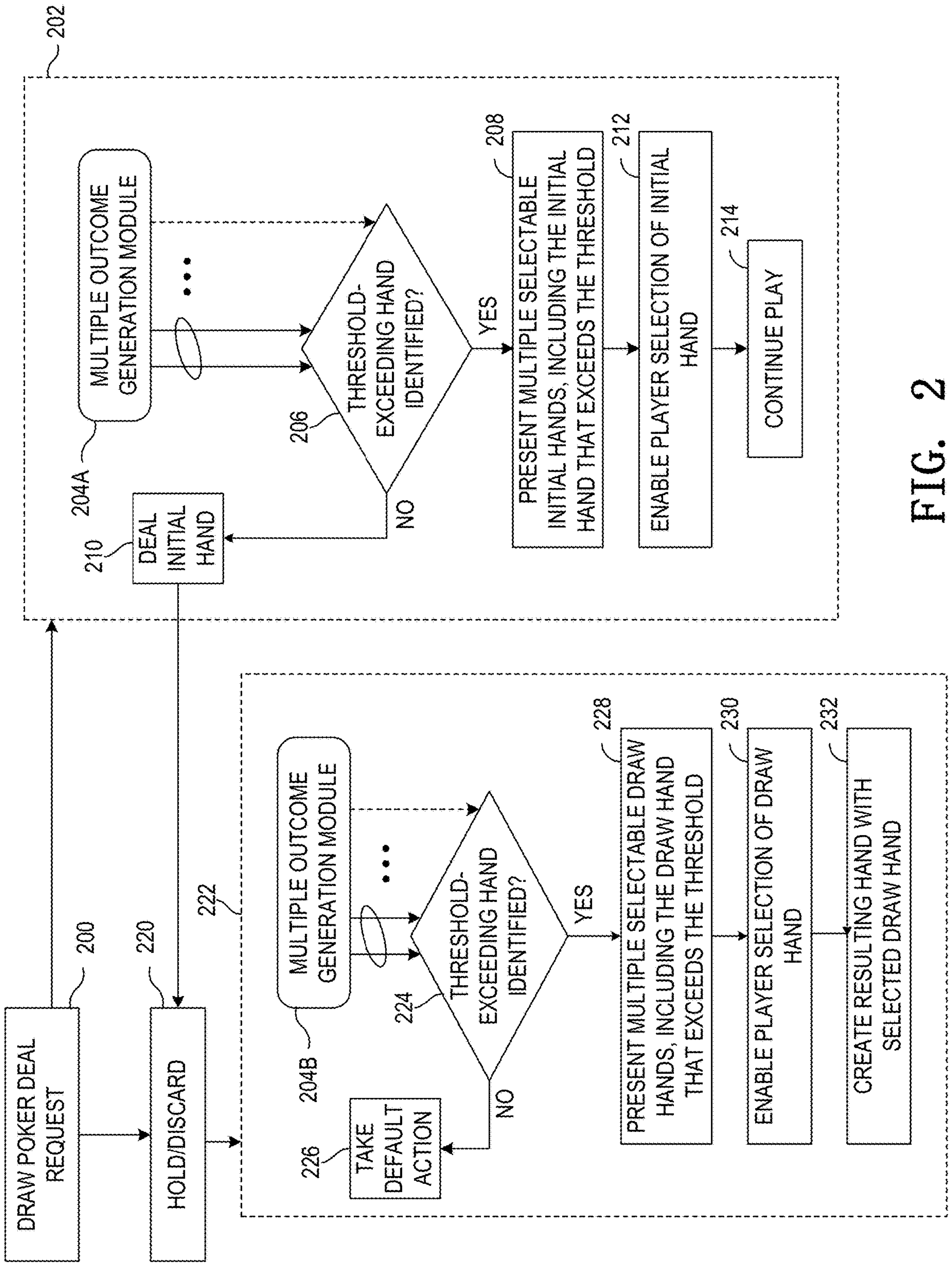
FIG. 2 is a flow diagram of another method of operating a gaming device according to embodiments of the invention.

FIG. 2 is a flow diagram relating to a poker game, and more particularly to a draw poker game where at least an initial hand is dealt, and at least one opportunity is provided to the player to hold cards, while discarding others in favor of obtaining replacement cards for those that have been discarded. The embodiment of FIG. 2 illustrates how the multi-outcome features described herein may be applied at the time of the initial deal and/or at the time of obtaining replacement cards.

Dealing of the draw poker hand is requested 200, such as by the player selecting a "deal" button or other user interface mechanism. In a first embodiment, the multi-outcome feature is provided in connection with this initial deal, as depicted at block 202. The multiple outcome generation module 204A generates at least two outcomes (where two outcomes is assumed for this example). If any triggering event occurs, such as determining that a threshold-exceeding hand has been identified at block 206, multiple selectable initial hands, including the initial hand that may have triggered the feature, are presented 208. Otherwise, the initial hand(s) without the generation of additional alternative hands may be dealt as depicted at block 210. In the case where multiple selectable hands are presented 208, the player is allowed to select 212 an initial hand(s) from the multiple hands that were generated, such as by selecting which of the initial hands is desired without being able to see at least some of the actual cards. Upon selection 212, play continues with the selected initial hand.

In addition to, or instead of, applying the feature at the initial deal stage, the feature may be applied when cards are being replaced in response to a hold/discard 220 decision by the player. For example, the multi-outcome feature may be provided in connection with replacing cards, as depicted at block 222. When one or more cards are being "discarded" (i.e. not held), multiple selectable sets of those replacement cards may be provided. For example, if the player holds three cards in a five-card draw poker game, multiple sets of two-card replacements ("two-card draws") may be presented. More particularly, the same or different multiple outcome generation module 204B may be used to generate a plurality of alternative outcomes. In one embodiment, multiple outcomes are generated when it is first determined that a replacement card set (i.e. "draw") has exceeded a threshold as determined at block 224. In another embodiment, the multiple outcomes are generated first, and it is then determined 224 whether any exceeds the threshold condition. If multiple outcomes are not to be presented to the user for failure of the threshold condition to be met, the default action is taken 226, such as presenting only the generated draw, without presenting multiple alternative outcomes/draws. Otherwise, where whatever condition(s) that are set to enable multiple selectable outcomes have been met, the multiple selectable draw hands, including any draw hand that exceeds the threshold condition, are presented 228 for selection to the player (e.g. such as providing the player with the option to select "Draw 1" or "Draw 2" without revealing the actual cards). The player is allowed to make a selection 230 of the desired draw hand(s), and the resulting hand(s) is created 232 with the selected draw hand(s).

Figure 3:
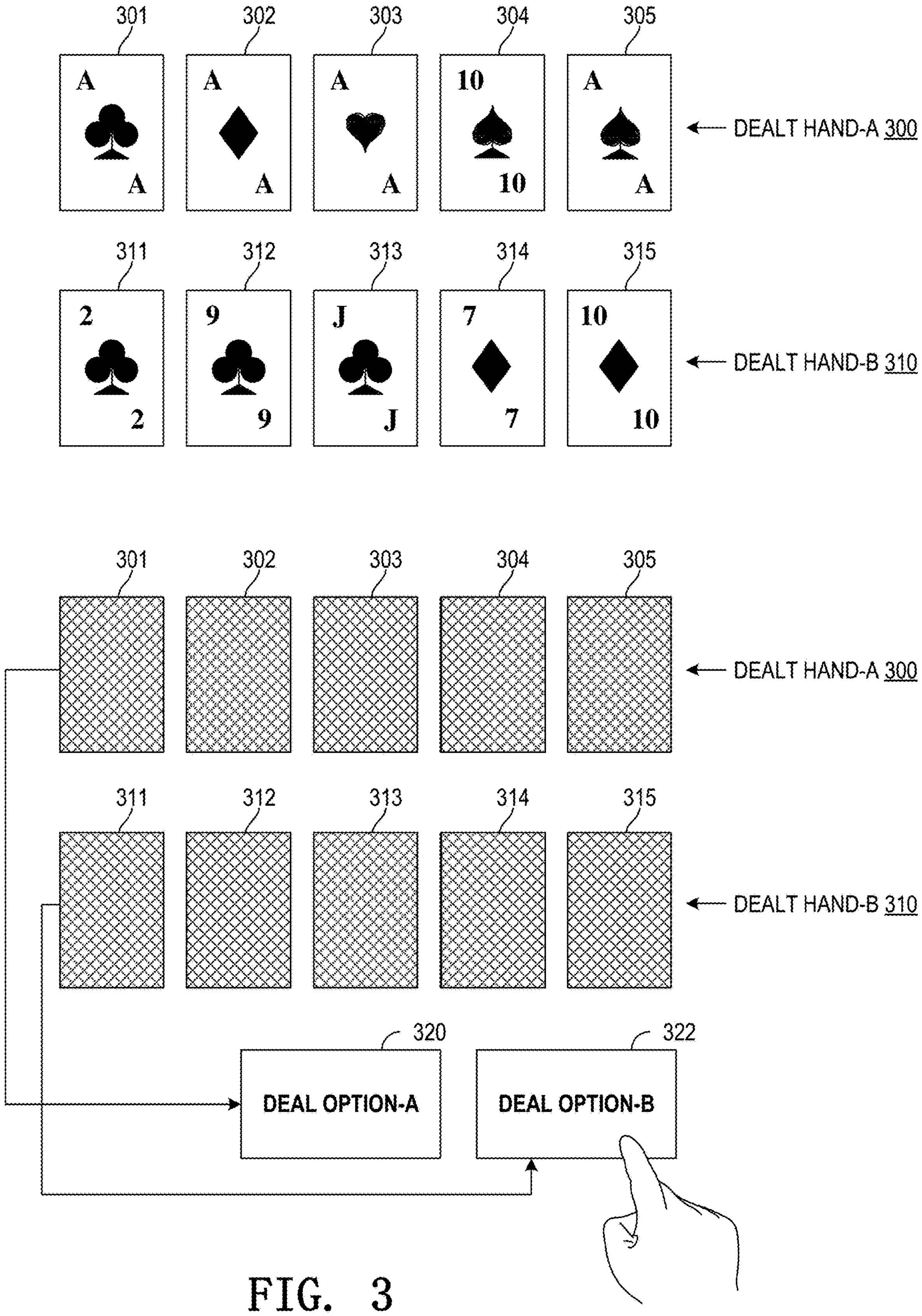
FIG. 3 is a diagram of example game play where multiple hands are presented in a poker game deal according to embodiments of the invention.

FIG. 3 illustrates an example of applying the multi-outcome feature at the initial hand stage in a draw poker embodiment. It should be recognized that the principles described in connection with this embodiment could alternatively be applied to other chance-based games.

In the illustrated embodiment, a player requests a deal in a video draw poker game. Multiple outcomes may be generated, either each time, or if a first outcome proves to be a winning outcome or exceeds some threshold, etc. In the illustrated embodiment, it is assumed that a threshold condition needs to be met in order to cause the one or more additional outcomes to be generated behind the scenes, such as by the processor and/or RNG where the multiple outcomes can be stored. The threshold condition could be, for example, at least three-of-a-kind, at least a flush, at least four-of-a-kind, or any desired threshold condition. For purposes of illustration, assume that the threshold condition for FIG. 3 is four-of-a-kind. Thus, assume the processor/RNG derive a hand-A 300 in response to the player's request for a draw poker deal. The generated hand-A 300 includes five cards 301, 302, 303, 304, 305, where four of the cards are Aces. In one embodiment, before this is revealed to the player, at least one other hand (exactly one additional hand in this embodiment), depicted as hand-B 310, which includes cards 311, 312, 313, 314, 315.

The player is then given an option to select between deal option-A 320 and deal option-B 322. If the player chooses deal option-A 320 in this example, he/she will select hand-A 300, and get the four Aces as the initial deal. If the player chooses deal option-B 322, he/she will select hand-B 310 to begin the draw poker hand.

In this example, the player is allowed to select between a known "good" initial hand, and at least one alternative hand. By presenting the second hand-B 310, the player's initial "good" hand of the four Aces is put at risk, although the player will not be informed of this in one embodiment. What can be done, however, is such a hand can be offered more often, as the player's selection will offset the greater frequency of such good hands being presented. In one example embodiment, if two selectable hands are provided when a threshold hand is met (e.g. a flush or better), the player will have a 50/50 chance of selecting the hand known to be a flush or better. However, such hands of a flush or better can be offered to the player twice as often, thereby keeping the mathematical probabilities of the player winning the flush or better the same.

Figure 4:
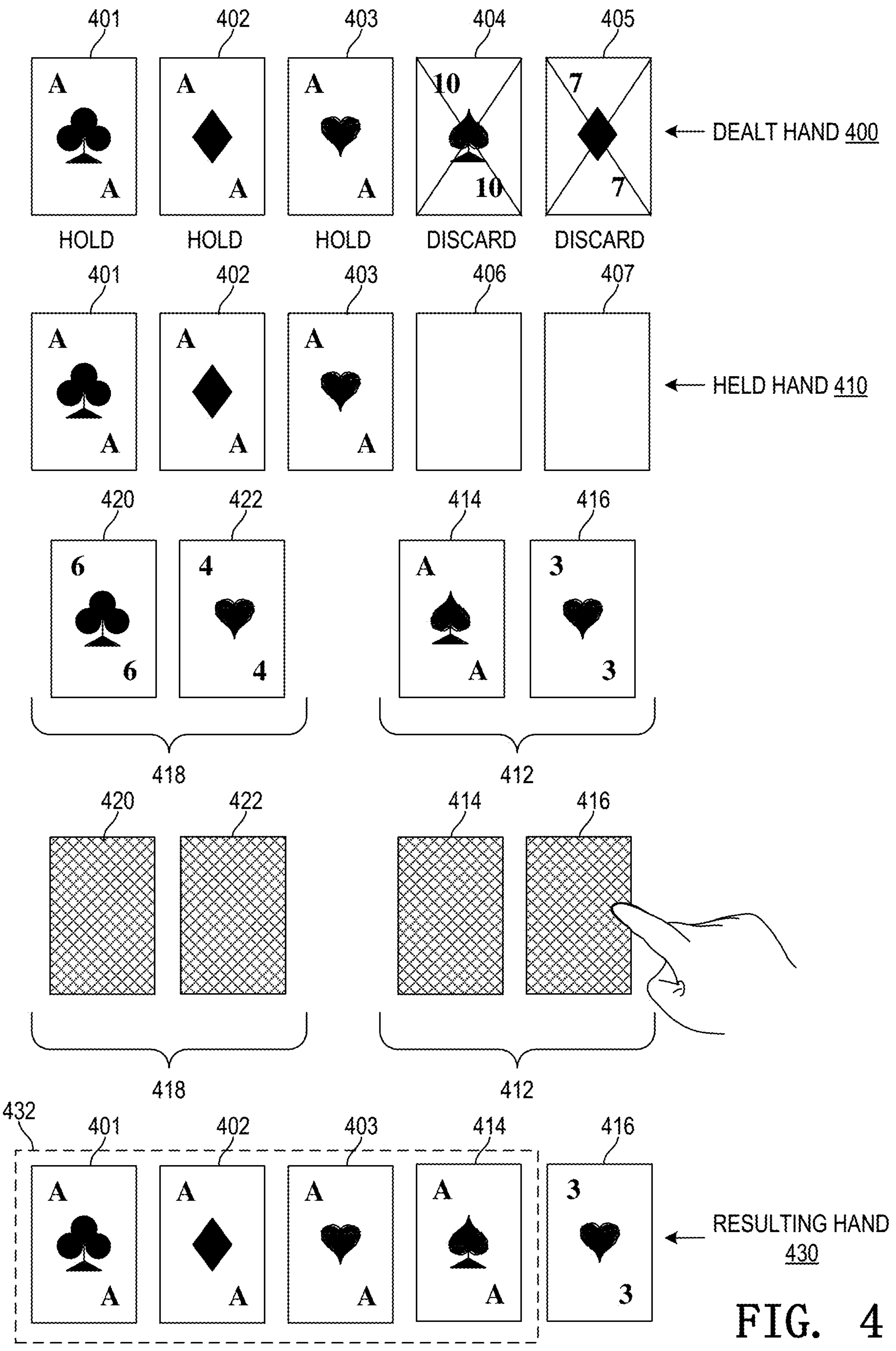
FIG. 4 is a diagram of example game play where multiple draw hands are presented in a draw poker game according to embodiments of the invention.

FIG. 4 illustrates an example of applying the multi-outcome feature at the draw stage in a draw poker embodiment. In the illustrated embodiment, the player is dealt a hand 400, having cards 401, 402, 403, 404, 405. In this example, the player holds the three Aces 401, 402, 403, and discards cards 404, 405, thereby resulting in the held hand 410, where two replacement cards will replace the discarded cards 404, 405 as depicted by card locations 406, 407. In this example, assume that draw hand 412, including cards 414, 416, is generated behind the scenes, and before being presented to the player. A triggering event, such as a poker rank of at least some defined poker rank, may be reached in view of the draw hand 412. In one embodiment, this prompts at least one additional draw hand 418, including cards 420, 422, to be generated behind the scenes. The user is then presented with the selectable draw options, such as being presented with the cards face down, or otherwise presented with a choice of, for example, Draw 1, Draw 2, etc. Assume the player selects draw hand 412, thereby revealing the underlying Ace 414 and Three 416, giving the player a resulting hand 430 of four Aces 432 with cards 401, 402, 403, 414. If the player had selected draw hand 418, the player's resulting hand would have only been three Aces 401, 402, 403.

By including this additional draw hand(s) in response to a favorable draw hand being generated behind the scenes, the player's chances are diminished by half in actually getting the four Aces. However, such an opportunity can be presented twice as often without impacting the mathematical probabilities of obtaining the four Aces, thereby providing the player with the excitement of having the known opportunity more often.

In other embodiments, multiple outcomes can be generated without using a first outcome in an analysis of whether a threshold condition has been met. For example, multiple outcomes can be generated by the processor/RNG, and if one of the outcomes meets the threshold condition, then the selectable options may be presented to the user. In still other embodiments, the additional outcome(s) may be generated when a first outcome is a known "loser" (e.g. where no payout will be made, or a payout below some threshold, etc.). The features described herein are applicable regardless of when or how such threshold condition is determined.

Some representative examples are now described of manners in which the multi-outcome features described herein may be implemented in chance-based games.

In one embodiment, players may be afforded an opportunity to select his/her draw poker result, whether at the initial deal stage and/or at the stage where discarded cards are being replaced. For example, in one embodiment, in a game of chance such as video poker, multiple initial deals and/or draw results are initiated behind the scenes and are not shown to the player. When a winning combination, or a combination meeting or exceeding a threshold poker rank, is achieved behind the scenes, first the number of deals/draws in the set is counted, and then each deal/draw may be presented to the player and randomized, without showing the particular characteristics of the cards (e.g. face down cards). The player is prompted to pick one of "X" (the number of deals/draws) for a chance at the winning combination. Since the act of selecting between 1 of X yields that same probability of achieving any of the X results, the feature is mathematically neutral.

For example, in the case where a winning result is determined behind the scenes, another alternative deal/draw may be generated to produce two outcomes, where one is the initial winning outcome, and the second is the alternative random outcome. By presenting the player with the choice to select between the two outcomes (and optionally notifying the player that one is a win, or even what the win outcome is), the player will be presented with an opportunity to win the threshold (or higher) poker rank twice as often, although will only statistically achieve the win at the same probability as if the winning poker rank had just been awarded to the player without presenting the player with the selectable option. The player will, in this example, be presented with the opportunity to win the amount twice as often, without changing the mathematical probability of the player actually achieving the winning outcome.

Thus, in some instances, the player may be trading off a win that occurred, in order to be presented with the ability to select (at least) one of a plurality of potentially winning outcomes, where at least one of those is indeed a winning outcome. Conversely, in some instances when there was not a win, additional chances (e.g. selectable draws in draw poker) are conducted to get a win, and the player is allowed to pick for that win. The mathematical neutrality is due to this kind of trade-off. The feature could occur before the deal, or during the draw phrase, in a draw poker embodiment.

Below are representative examples of the multi-outcome selection features occurring within various games of chance.

Figure 5A:
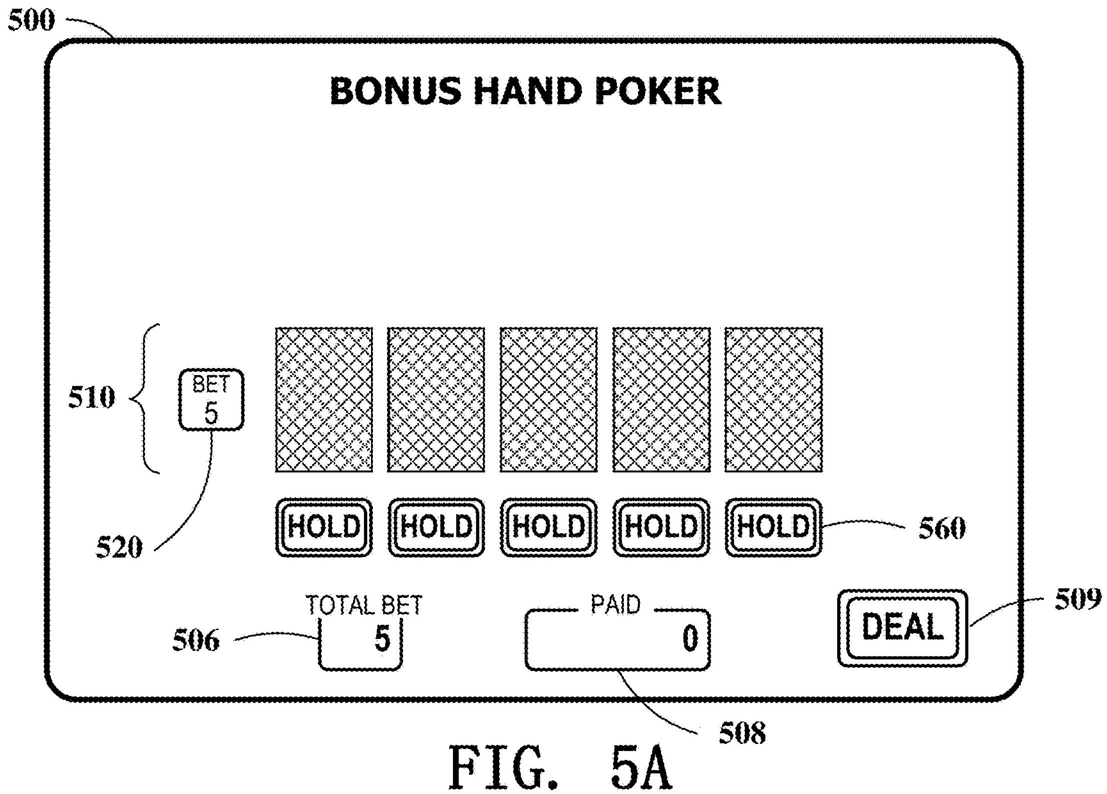
FIGS. 5A, 5B, and 5C are detail diagrams of a gaming display illustrating a game progression of a game using enhanced outcome opportunities according to embodiments of the invention.
Figure 5B:
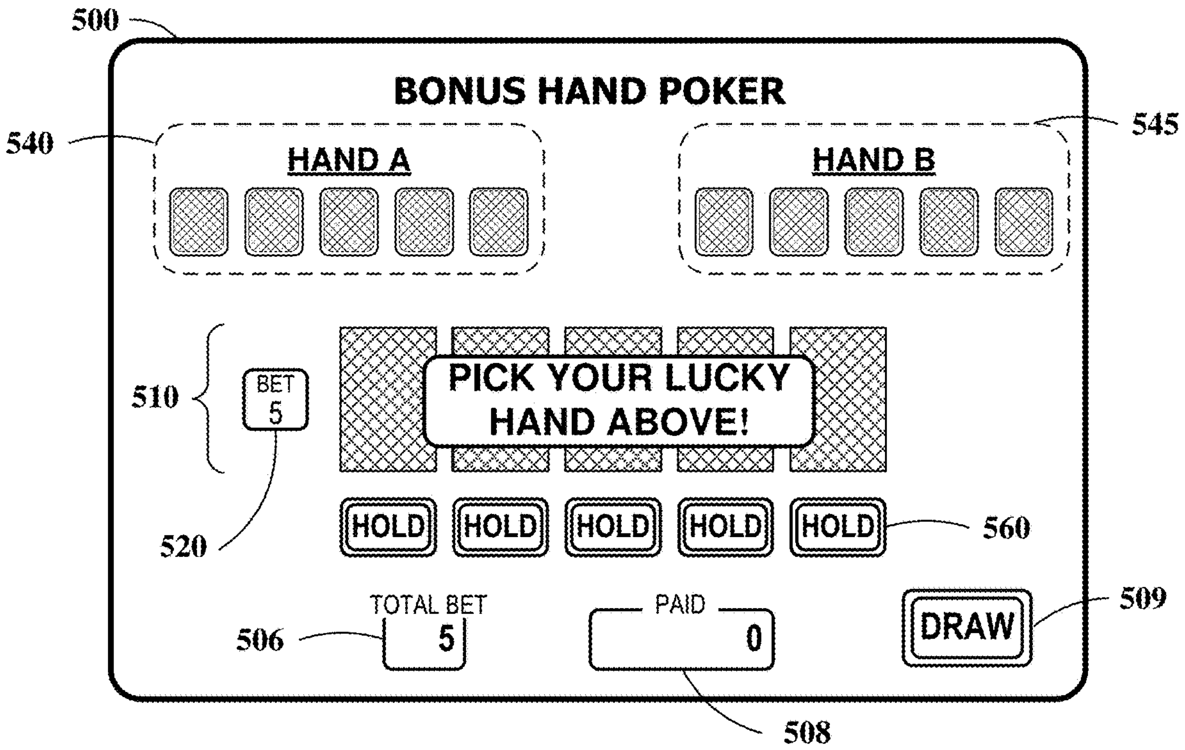
Figure 5C:
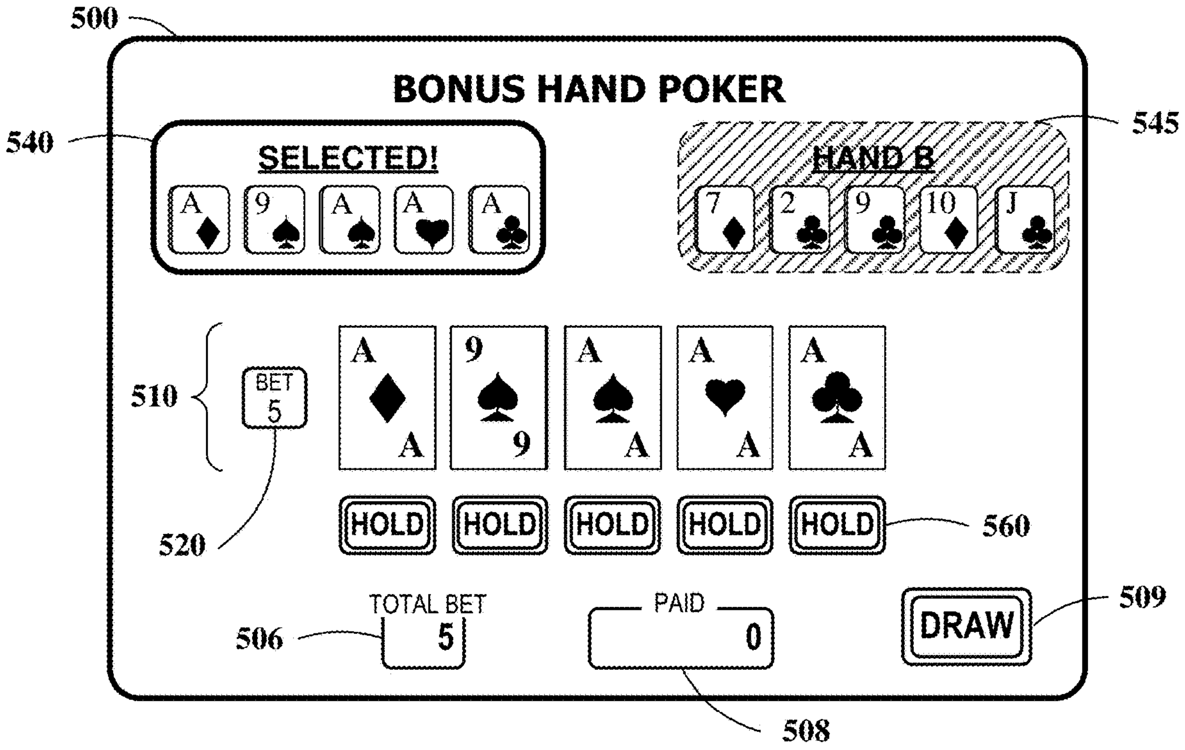

FIGS. 5A, 5B, and 5C show a video poker embodiment where the enhanced gaming outcome opportunity occurs on the deal of the poker hand. Referring to FIGS. 5A, 5B, and 5C, a gaming display 500 includes a game play area 510 including five poker cards and a BET indicator 520. A player interface area includes a TOTAL BET meter 506, a PAID meter 508, and one or more game buttons, such as a DEAL/DRAW button 509, and multiple HOLD buttons 560 for holding cards in a draw poker game. Here, the player has placed a wager of 5 credits. After the player activates the DEAL button 509 (or otherwise initiates the game), the game generates multiple dealt hands and determines if these dealt hands meet a predefined criterion as discussed above. For this embodiment, the gaming device generates two dealt hands and determines is either dealt hand includes a high pair or better hand. If neither of the possible outcomes results in a hand with a high pair (Jacks or better) or better hand, the game shows the first selected hand as the dealt hand. If however, one or both of the possible dealt hands include a high pair or better, the game presents the two possible dealt hands "face down" and directs the player to select one of the possible dealt hands, as shown in FIG. 5B.

Here, the gaming display 500 now shows a first possible dealt hand, "Hand A" 540, and a second possible dealt hand, "Hand B" 545. As shown in FIG. 5C, after a player selects one of the possible dealt hands, the game reveals both possible hands, and completes the main game area 510 with the cards from the selected dealt hand. In this embodiment, the play may now hold and/or draw cards for a final hand.

In another example, suppose cards are dealt and the player receives 4 Aces on the Deal. Behind the scenes another draw is conducted, not resulting in 4 Aces on the Deal (A-C, A-D, A-H, 9-S, A-S). In one embodiment, the results of Draw 1 and Draw 2 are not shown to the player, until the player makes a selection as described below. In this example, Draw 1 is the hand A-C, A-D, A-H, 9-S, A-S, while Draw 2 is a non-winning hand of 2-C, 9-C, J-C, 7-D, 10-D.

The player is prompted to pick between Draw 1 and Draw 2 (which, in this example, is selecting between one of two initial hands or "deals"). In one embodiment, the actual winning poker rank that is one of the plurality of selectable options could be made known to the player (e.g. "You are picking for a win of 4 Aces!")

If the player picks Draw 2 in this example, he/she would not win the 4 Aces, and in fact would win nothing assuming the poker rank shown in Draw 2 is not a winning poker rank on the paytable. On the other hand, if the player had picked Draw 1 in this example, he/she would win the payout associated with 4 Aces.

Conversely, if the player was dealt a non-winning hand, additional deals/draws could be conducted until a winner was picked. For example, if cards are dealt and the player does not receive a non-winning combination on the Deal, another deal may be conducted behind the scenes to produce two alternative deals. In this embodiment, if the second deal results in a win or otherwise exceeds a threshold, the player will be presented with the ability to select between these two deals. In other embodiments, the player may be presented with the ability to select between the multiple outcomes whether or not the second deal results in a win or exceeded a threshold—e.g. an embodiment where the player is always allowed to make a selection. As in the previous example, one embodiment involves keeping the actual card characteristics (e.g. poker rank and suit) hidden from the player until the selection is made, such as by keeping the actual or virtual cards "face down."

In this example, the player is prompted to pick between Draw 1 and Draw 2 (which in this example corresponds to two initial hands, such as two alternative initial deals in draw poker). In some embodiments, two buttons or other user interface mechanisms are provided to facilitate a 50/50 chance of getting a winning hand on the deal by picking one of the two buttons. The neutrality could be maintained as well even when a greater number of buttons is presented; for example, instead of two buttons (one winning and one alternative), ten buttons could be shown where five of them represent the winning selection, and the other 5 represent five different random selections (or the same random selection five times, etc.). In yet other embodiments, the mathematical probability can be adjusted from 50/50 by varying the number of selectable options (e.g. probability could be increased from 50% 66.7% by presenting the player with three selectable options, where two of the options are duplicates of the winning outcome).

Figure 6A:
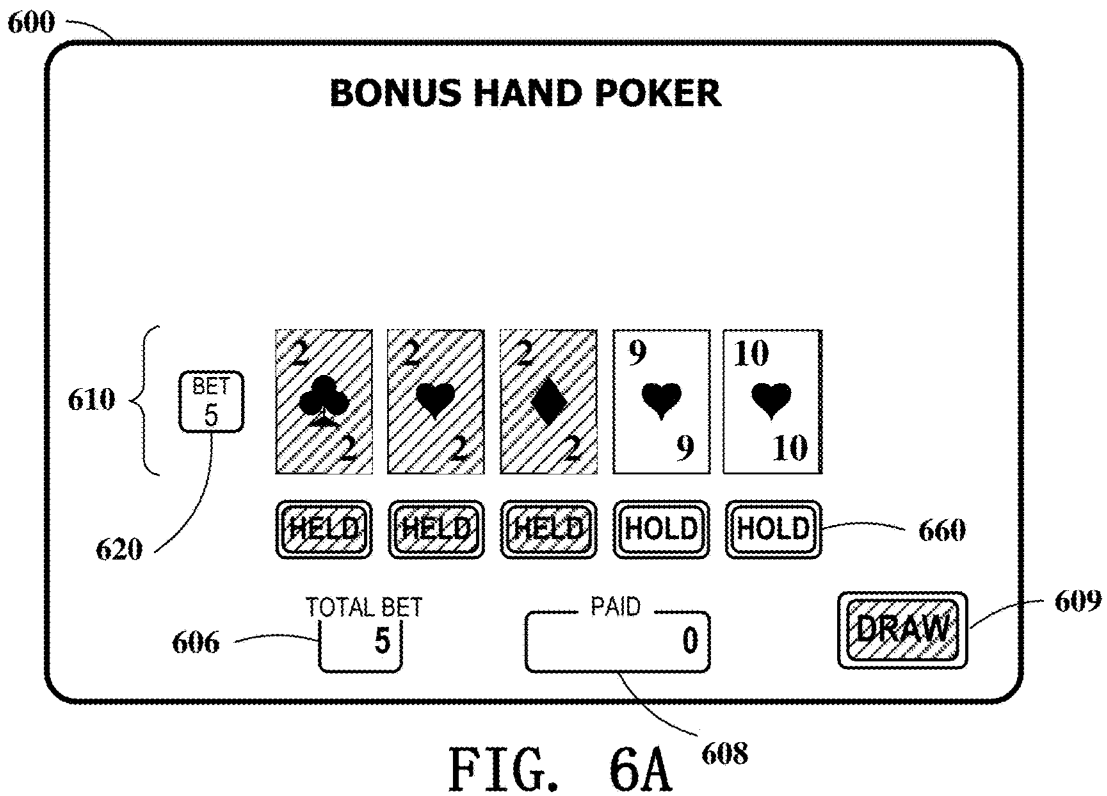
FIGS. 6A, 6B, and 6C are detail diagrams of a gaming display illustrating a game progression of another game using enhanced outcome opportunities according to embodiments of the invention.
Figure 6B:
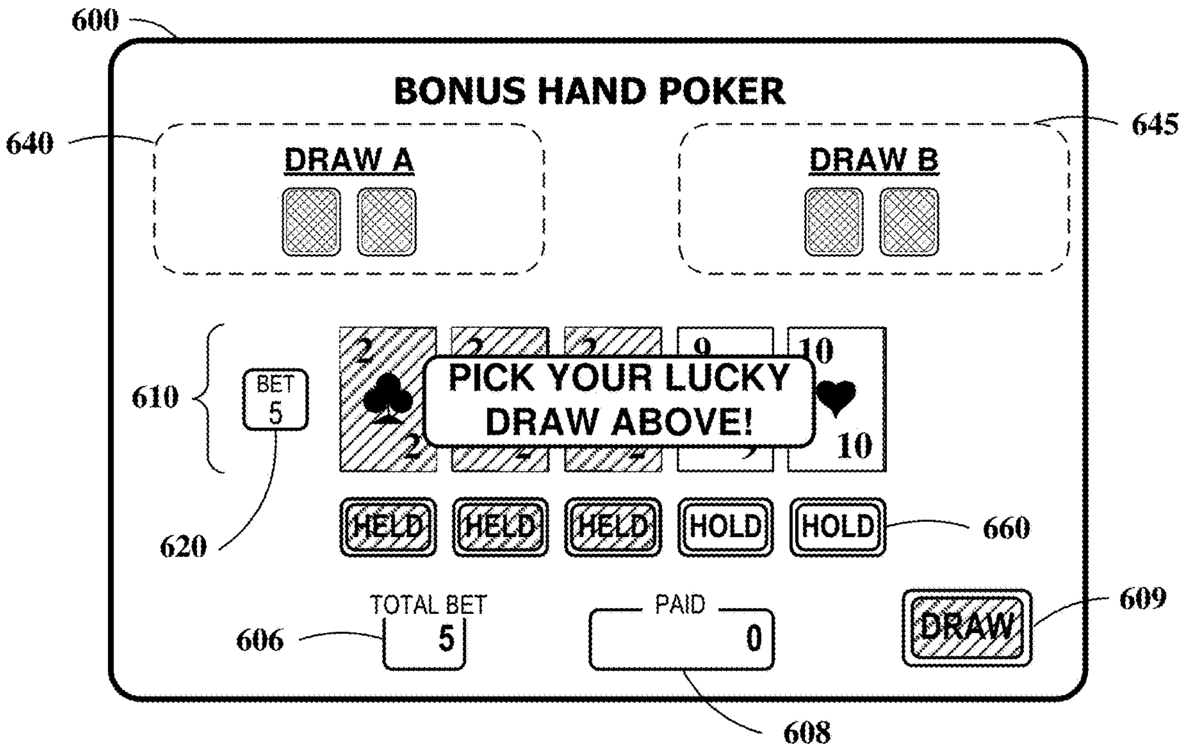
Figure 6C:
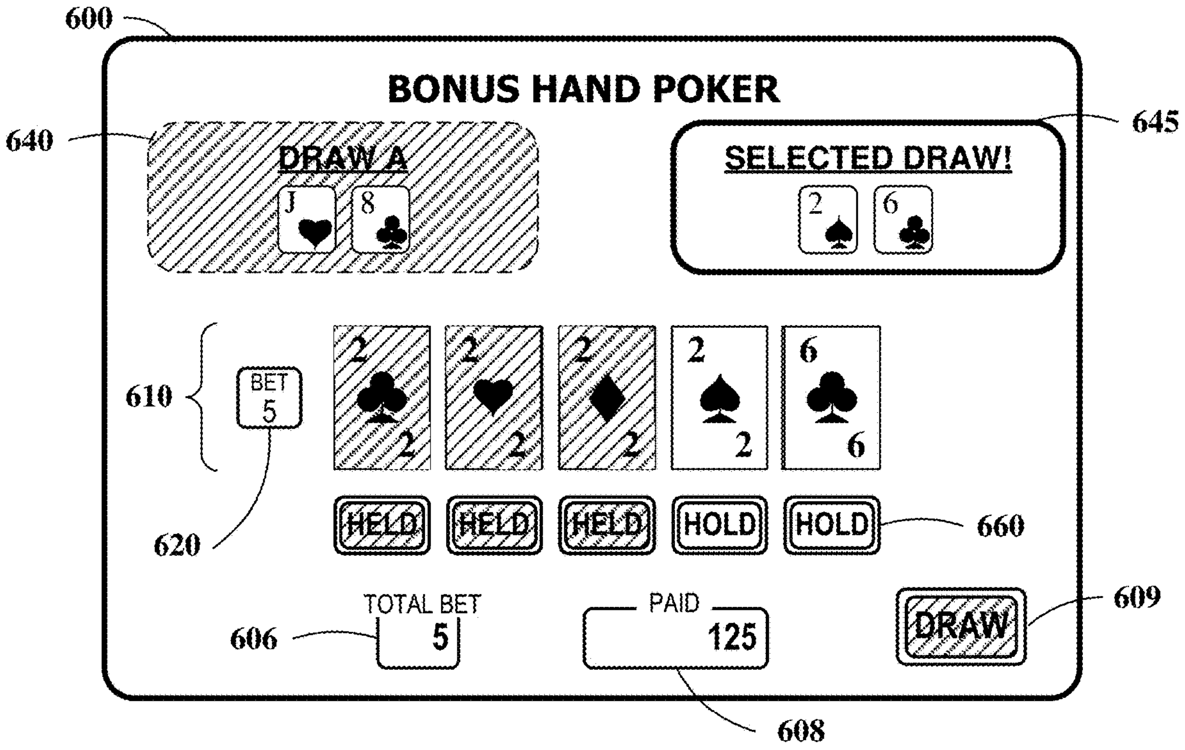

FIGS. 6A, 6B, and 6C show a video poker embodiment where the enhanced gaming outcome opportunity occurs after the deal and on the draw of a poker hand. As discussed above, other embodiments could allow for a multiple outcome opportunity on both the deal and draw stages of a video poker game. Referring to FIGS. 6A, 6B, and 6C, a gaming display 600 includes a game play area 610 including five poker cards and a BET indicator 620. A player interface area includes a TOTAL BET meter 606, a PAID meter 608, and one or more game buttons, such as a DEAL/DRAW button 609, and multiple HOLD buttons 660 for holding cards in a draw poker game. Here, the player has placed a wager of 5 credits. After the player activates the DEAL button 609 (or otherwise initiates the game), the game displays a dealt hand of cards and allows the player to hold none, some, or all of the cards. In the embodiment shown in FIG. 6A, a poker hand has been dealt (2-C, 2-H, 2-D, 9H, 10-H), and the player has held the three deuces and pressed the DRAW button 609.

The game then generates multiple possible draw results and determines if any of these draw cards meet a predefined criterion as discussed above. For this embodiment, the gaming device generates two draw hands and determines if either draw hand improves the dealt hand to have a higher payout or award. If neither of the possible outcomes results in an improved final hand, a traditional draw may appear to be executed on the gaming device. Here, one of the multiple possible draw hands may be used to complete the hand, or other cards may be drawn to complete the hand. If, however, one or both of the possible draw hands include a one or more cards that improves the award over the dealt hand, the game presents the two possible draw cards "face down" and directs the player to select one of the possible draw card hands, as shown in FIG. 6B.

Here, the gaming display 600 now shows a first possible draw hand, "Draw A" 640, and a second possible draw hand, "Draw B" 645. As shown in FIG. 6C, after a player selects one of the possible draw hands, the game reveals both possible hands, and completes the main game area 610 with the cards from the selected draw hand.

In another example, a hand is dealt with the cards K-C, K-D, K-S, 9-H, 5-C. The player likely opts to hold the three kings, and initiate the draw to discard the 9-H and 5-C. Behind the scenes the two separate draws are conducted (one of which results in a winning combination for the player), resulting in Draw 1 and Draw 2. In one embodiment, the results of Draw 1 and Draw 2 are not shown to the player, until a selection is made. The player is prompted to pick between Draw 1 and Draw 2.

The results of each Draw are shown to the player, after a pick is made. Alternatively, only the selected draw may be shown to the player, but in this example both results are shown to the player after one has been selected: Draw 1 (K-H and 8-H; 4-H and 6-H). In the example above, the player selected between two draws. The player could also pick between more draws depending on how many cards he/she is drawing to, up to and including an infinite number of draws if more than 1 deck is used.

The following examples illustrate more than 1 draw. In one embodiment, the poker game itself may have payout thresholds where a premium is paid for getting 4 Aces with the fifth card having a certain poker rank, such as a 2, 3, or 4 "kicker." In such an embodiment, the feature could always be presented to create enhanced excitement of picking up this kind of hand. The trade-off would be that when this kind of hand occurred naturally on the draw, the game device would generate and conduct additional draws, and make the player pick between these draws in order to win the hand.

For instance, an initial dealt hand of cards may include A-C, A-D, A-H, A-S, 10-C and the player may opt to hold the four aces and discard the 10-C. This may be the case in an embodiment where a premium is paid for certain "kickers" with a 4-of-a-kind, such as a 2, 3 or 4.

Behind the scenes, this embodiment involves conducting 5 draws, one of which results in an improved winning combination for the player. The resulting selectable options are shown, and the player is prompted to pick between Draw 1, 2, 3, 4, and 5. The results of each Draw are shown to the player, after one of the selectable options has been picked. As only one card was discarded, each of the selectable draws will include only one card in this five-card poker embodiment. In this example, the draws are: Draw 1 is 3-C; Draw 2 is 8-C; Draw 3 is J-C; Draw 4 is 7-D; and Draw 5 is J-D. Here, if Draw 2 is selected, which is an 8-Clubs in this embodiment, it would not improve the player's hand. If, however, the player had selected the "Draw 1" options, he/she would have improved the hand by adding the premium "kicker" card 3-C to the hand, resulting in "4 aces with a 2, 3, or 4" combination, which in this embodiment, is associated with a larger award.

In a 10-draw embodiment, suppose that the dealt cards are 2-C, 2-D, 2-H, 8-H, 9-H and that the player has elected to hold the 2-C, 2-D, 2-H and discard the 8-H, 9-H. The gaming apparatus then conducts 10 draws to generate 10 possible draw outcomes. In some embodiments, these outcomes are generated so that one of the possible outcomes will be an improved winning combination for the player. In other embodiments, each of the possible outcomes is determined at random, and may rely on a criterion test to determine if the 10 outcomes are to be displayed to the player. In this embodiment, the draws are as follows: Draw 1 is 10-C and 3-D; Draw 2 is 8-D and 3-C; Draw 3 is K-C and 4-D; Draw 4 is 6-S and 9-S; Draw 5 is 6-H and 2-S; Draw 6 is A-H and J-H; Draw 7 is 8-S and 10-S; Draw 8 is 3-H and 6-D; Draw 9 is 4-H and 9-D; and Draw 10 is 7-H and 5-S. If the player selects Draw 5, the resulting final hand will be a four-of-a-kind with four 2's.

The features described herein could be implemented on any dealt hand, without any threshold criteria. Alternatively, criteria could be used to present the feature on high value hands. The feature could be displayed in discrete situations either configured by the operator or selectable and configurable by the player. Furthermore, criteria and thresholds could be used in any game of chance to make the feature engaging and exciting to the player, by isolating key situations for feature presentation.

In video poker, such situations could be "3 of kind" or greater, "4 to a Royal or Straight Flush", "4 2 s, 3 s, 4 s without an Ace kicker," "4 Aces without an 2, 3, 4 kicker," etc. Any threshold could be created, whether corresponding to a particular winning poker rank or not. However, as in embodiments described above, the feature is presented when an outcome (whether on the deal, the draw, or other time in this or another game) is a payable win, where at least one additional outcome is generated, and the player is allowed to select between the plurality of outcomes. In a 50/50 situation, the player would statistically be presented with the potential win twice as often, but would win the same number of times, as the player would essentially be unknowingly giving up the win in approximately 50% of the cases.

In another variation, the player could opt not to accept the feature, or to override it and go with the first run (deal/draw). The player could opt to accept the feature and pick themselves, or allow the machine to automatically pick for them.

The player could specify when they want the feature active—for example, the feature could occur on every hand. Players may get to pick the type of hands that they want the feature activated on, which can be facilitated via a properly configured user interface. For example, there could be a sliding type of mechanism, where the player can slide the indictor to between hand thresholds to choose on which hands the feature is active. For example, a slider could range from the top paying hands to the lowest paying hands. The player could slide the slider to "4 of Kind" and have the feature occur on hands of "4 of Kind" or better. Or the player could pick any discrete hand type to activate the feature, by picking or indicating discrete hand types (e.g. perhaps the player only wants the feature to occur on Royal and Straight Flushes).

Betting can be implemented in a normal fashion. The concept in some embodiments is mathematically neutral, and consequently does not require any deviation from standard betting structure on the particular game of chance. In other embodiments, additional bonus bets could be wagered to skew the mathematical neutrality in order to enhance the gaming experience by, for example, increasing the frequency of the feature, and therefore increasing the probability of receiving certain outcomes in a game of chance.

For example, a bonus bet could be wagered that causes the feature to become "non-neutral" from a mathematical perspective, and to increase the player's chance at achieving a winning or improved winning combination. Some of these embodiments are discussed below.

Figure 7A:
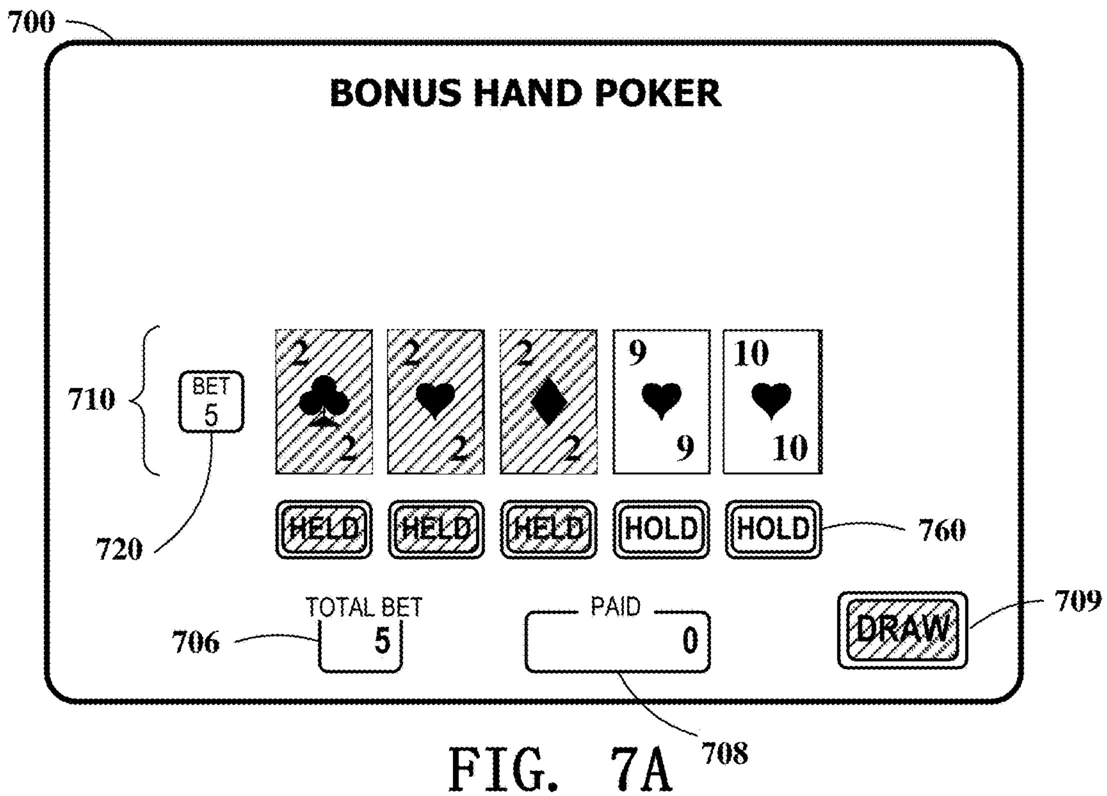
FIGS. 7A, 7B, and 7C are detail diagrams of a gaming display illustrating a game progression of another game using enhanced outcome opportunities according to embodiments of the invention.
Figure 7B:
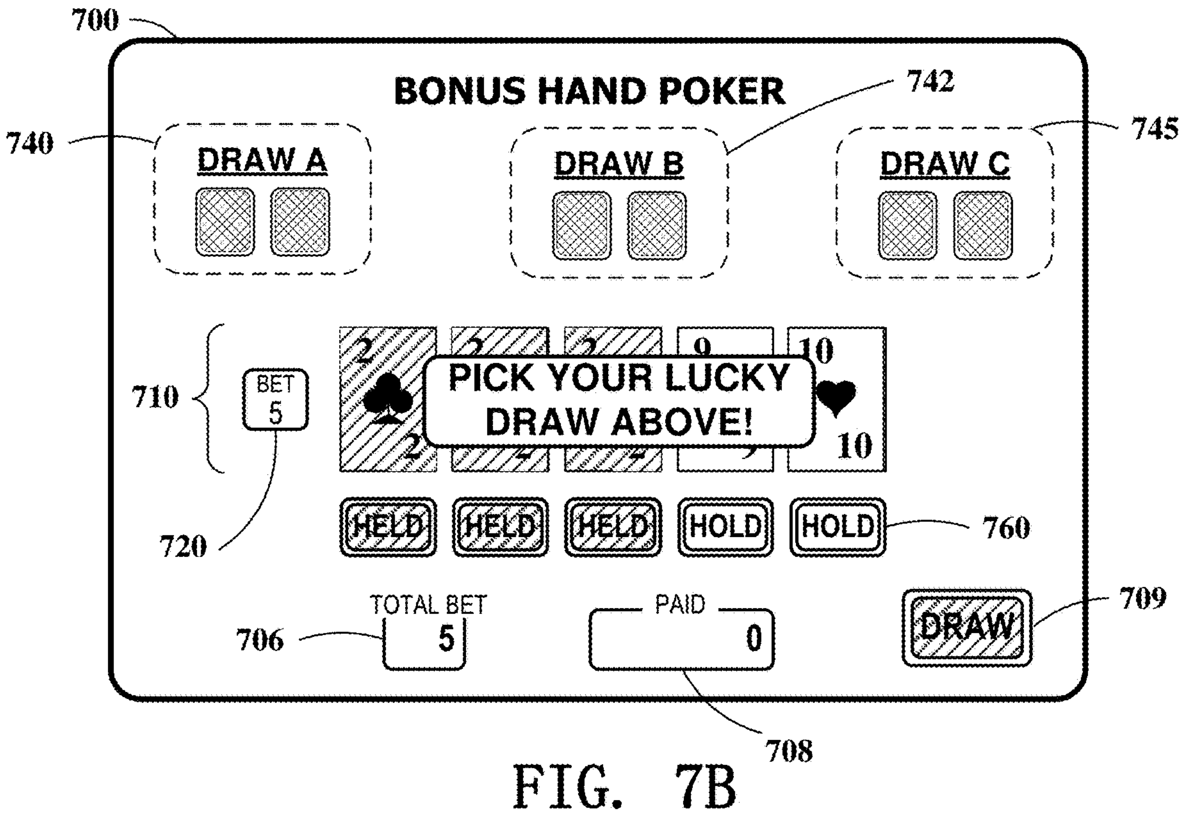
Figure 7C:
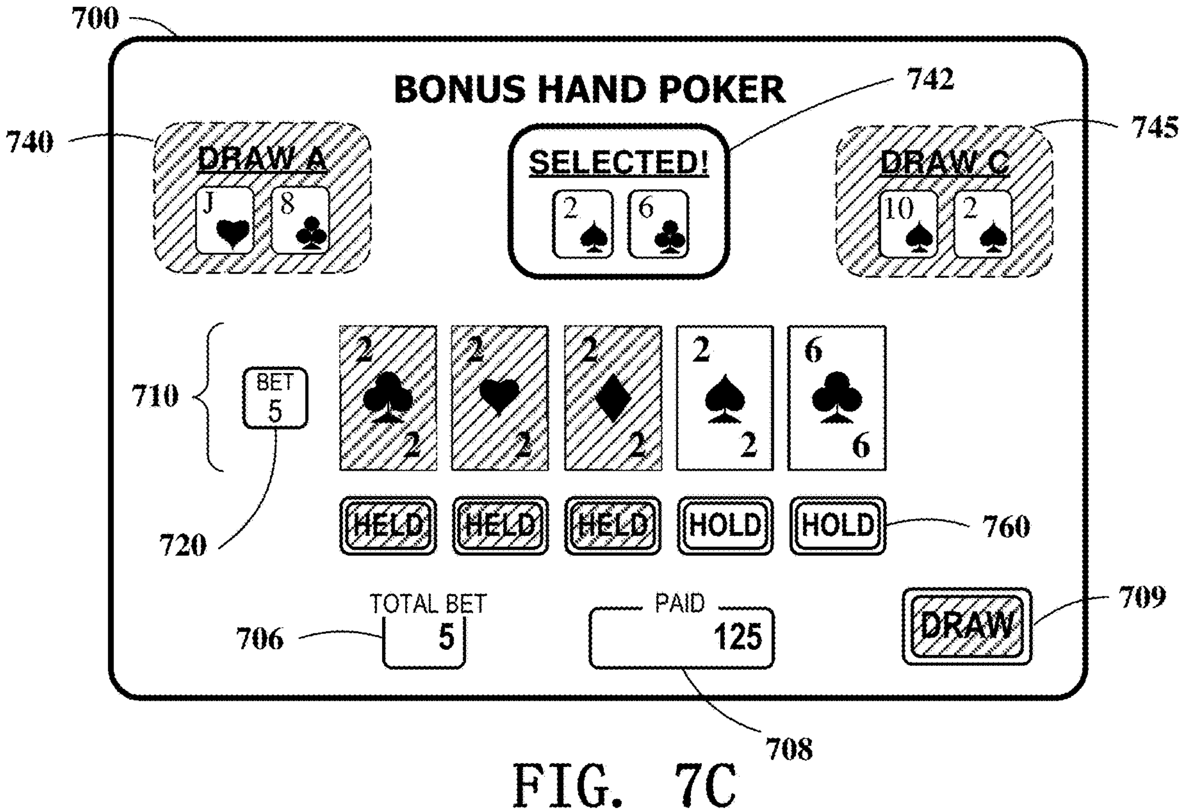

FIGS. 7A, 7B, and 7C are detail diagrams of a gaming display illustrating a game progression of another game using enhanced outcome opportunities according to embodiments of the invention. Referring to FIGS. 7A-7C, a gaming display 700 includes a game play area 710 including five poker cards and a BET indicator 720. A player interface area includes a TOTAL BET meter 706, a PAID meter 708, and one or more game buttons, such as a DEAL/DRAW button 709, and multiple HOLD buttons 760 for holding cards in a draw poker game. Here, the player has placed a wager of 5 credits. After the player activates the DEAL button 709 (or otherwise initiates the game), the game displays a dealt hand of cards and allows the player to hold none, some, or all of the cards. In the embodiment shown in FIG. 7A, a poker hand has been dealt (2-C, 2-H, 2-D, 9H, 10-H), and the player has held the three deuces and pressed the DRAW button 709.

The game then generates multiple possible draw results and determines if any of these draw cards meet a predefined criterion as discussed above. Unlike the embodiment shown in FIGS. 6A-6C, this embodiment includes the gaming device generating three draw hands and ensuring that probabilities of achieving a winning outcome and an award are improved for the "bonus bet." To do this, the gaming device determines may simply select three (or more) possible outcome hands, or when one of two (or more) selected possible outcome draw hands is determined to be a winning hand, the wining hand can be replicated in another possible draw location to increase the percentage of picking a winning hand from 50% to 66.67%. If neither of the possible outcomes results in an improved final hand, a traditional draw may appear to be executed on the gaming device. Here, one of the multiple possible draw hands may be used to complete the hand, or other cards may be drawn to complete the hand. If, however, one or both of the possible draw hands include a one or more cards that improves the award over the dealt hand, the game presents the multiple possible draw cards "face down" and directs the player to select one of the possible draw card hands, as shown in FIG. 7B.

Here, the gaming display 700 now shows a first possible draw hand, "Draw A" 740, a second possible draw hand, "Draw B" 742, and a third possible draw hand, "Draw C" 745. As shown in FIG. 7C, after a player selects one of the possible draw hands, the game reveals both possible hands, and completes the main game area 710 with the cards from the selected draw hand.

In another example, suppose the cards dealt are A-C, A-D. A-H, 8D, and K-C, where the player has held the three Aces and has discarded the 8-D and K-C. Unseen to the player, the gaming device then conducts two draws, one of which improves the final hand if selected. The winning draw is then duplicated so there are three possible draws to select from, where 2 out of the 3 are associated with improved hands. Here, the draws are as follows: Draw 1 is A-S and 3-D; Draw 2 is 6-S and 3-C, and Draw 3 is just a replicate of Draw 1 (A-S, 3-D). Here, if the player selects Draw 1 or 3, he/she will obtain a four-of-a-kind.

It should be noted that the concept can be applied to any game of chance, where outcomes are determined randomly, whether using an RNG or live items such as cards. This concept can be applied to games such as video poker, keno, slot machine games, live card games, electronic craps (using technology such as card readers or digital signature type readers), or the like. Below is a representative example of implementing the multi-outcome feature to a slot game.

Figure 8A:
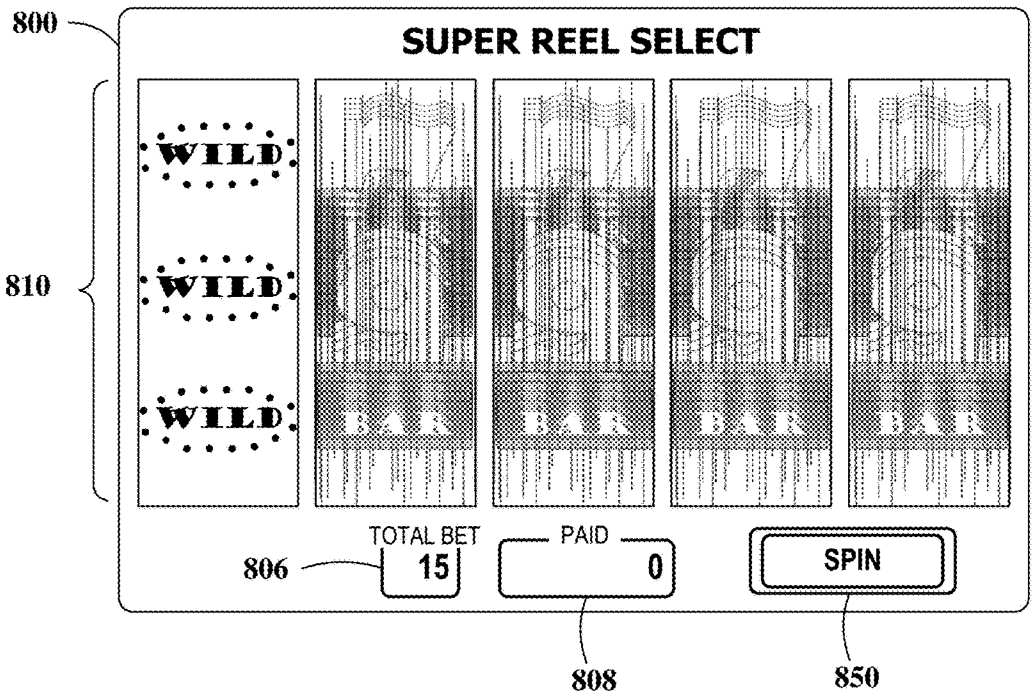
FIGS. 8A, 8B, 8C, and 8D are detail diagrams of a gaming display illustrating a game progression of another game using enhanced outcome opportunities according to embodiments of the invention.
Figure 8B:
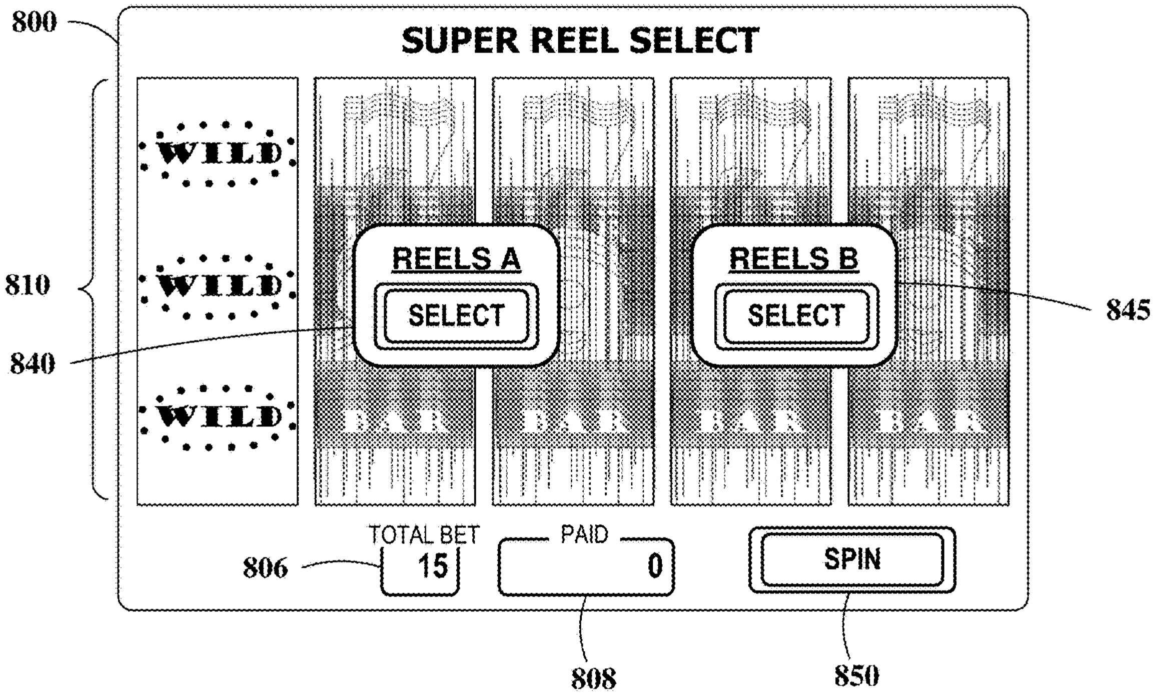

FIGS. 8A, 8B, 8C, and 8D are detail diagrams of a gaming display illustrating a game progression of another game using enhanced outcome opportunities according to embodiments of the invention. Referring to FIGS. 8A-8D, a gaming display 800 includes a game play area 810 including five video slot reels, although other embodiments may utilize more or fewer reels, or physical reels. A player interface area includes a TOTAL BET meter 806, a PAID meter 808, and one or more game buttons, such as a SPIN button 809. Here, the player has placed a wager of 15 credits. After the player activates the SPIN button 809 (or otherwise initiates the game), the reels in the game play area 810 spin. Here, multiple reel outcomes are determined, and are displayed if one or more of the possible outcomes include an improved award. In the embodiment shown in FIG. 8A, the reels of the slot machine 800 have been spun and the first reel has been stopped. If one or more of the possible outcomes is associated with an award or otherwise satisfies a trigger condition, possible game outcomes are determined and displayed for selection, as shown in FIG. 8B—such as buttons 840 and 845.

Figure 8C:
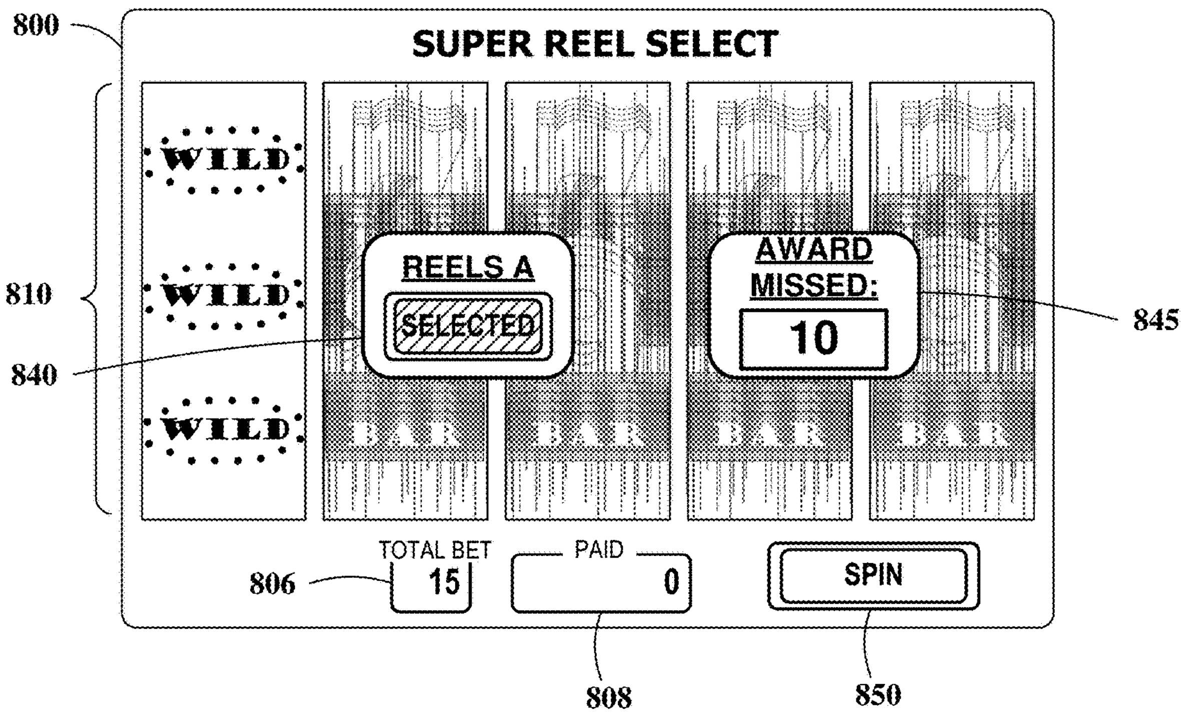
Figure 8D:
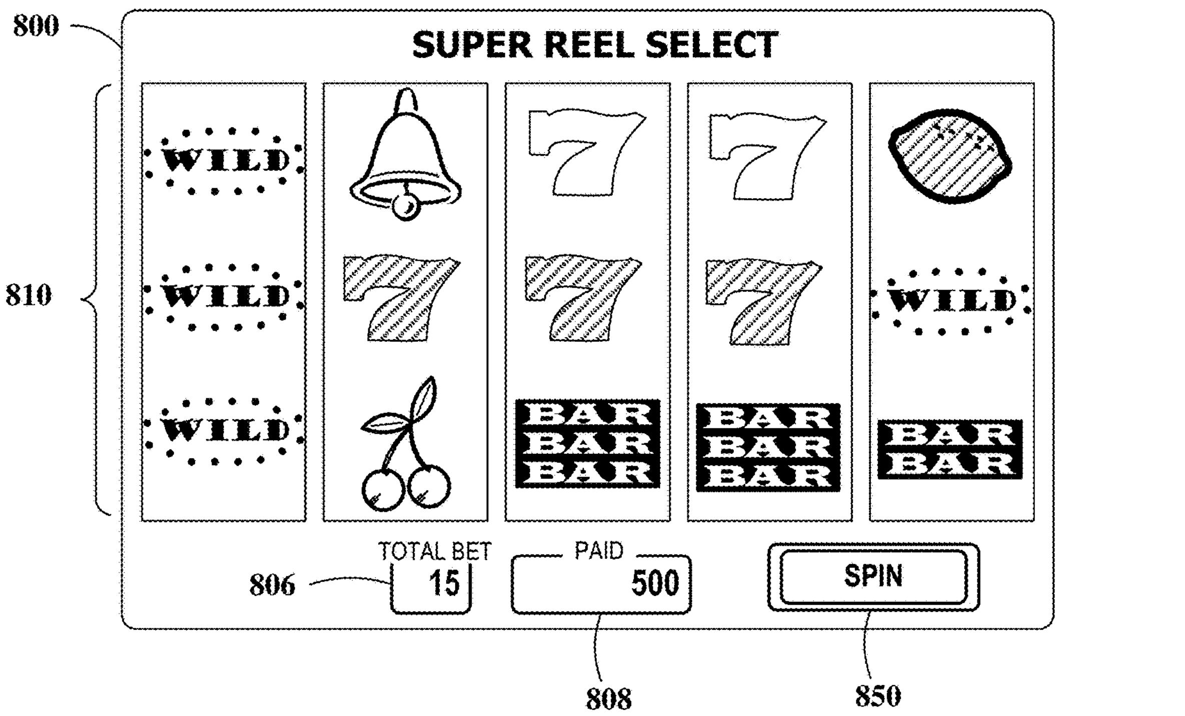

As shown in FIG. 8C, the REELS A button 840 was selected by the player. The credit award associated with the other selection (here, REELS B) may be shown on the non-selected button 845. On the other hand, the final credit reward for the slot game may not be shown on the selected button 840 to build excitement. In this example, the non-selected button was associated with an award of 10 credits, as shown FIG. 8C. On the other hand, the selected button is merely deactivated while the slots come to rest to show the actually final prize. Here, as shown in FIG. 8D, five shaded-sevens appear on a middle payline, resulting in an award of 500 credits.

In another example, game reels are spun and a criterion is used to determine the presentation of the feature when there is a potential winning combination present. Behind the scenes the two separate draws (reel spin results) are conducted, one of which results in a winning combination for the player in this embodiment. The selectable "draws" in this example are shown at Draw 1 and Draw 2 options below. In this embodiment, the results of Draw 1 and Draw 2 are not shown to the player, until a selection is made.

As discussed above, the player is prompted to pick between Draw 1 and Draw 2 when a threshold condition is satisfied. The illustrations above show the feature initiated with a potential winning combination after reel 1 was stopped. The feature could alternatively be initiated before the first reel stops, could be initiated after a partial win was determined, etc.

Figure 9:
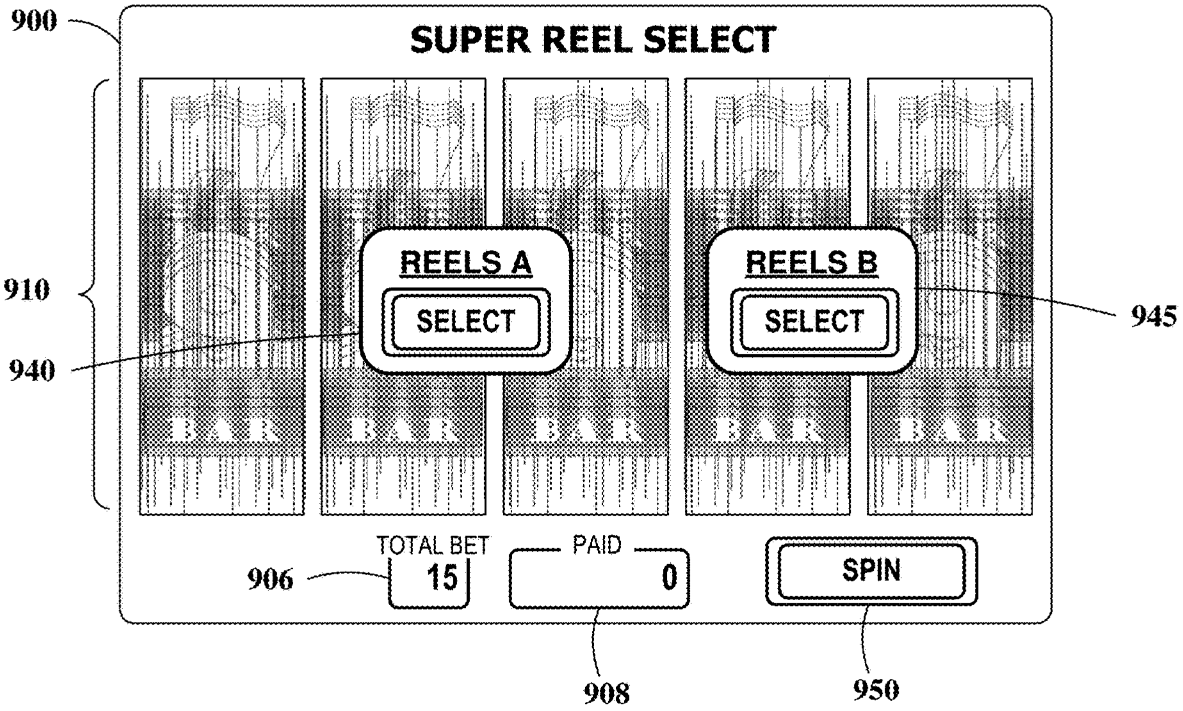
FIG. 9 is a detail diagram of a gaming display illustrating an example game using enhanced outcome opportunities according to embodiments of the invention.

FIG. 9 illustrates a detail diagram of a slot embodiment, where the player is allowed to select between multiple possible outcomes when the reels are spun. Referring to FIG. 9, a gaming display 900 includes a game play area 910 including five video slot reels, although other embodiments may utilize more or fewer reels, or physical reels. A player interface area includes a TOTAL BET meter 906, a PAID meter 908, and one or more game buttons, such as a SPIN button 909. Here, the player has placed a wager of 15 credits. After the player activates the SPIN button 909 (or otherwise initiates the game), the reels in the game play area 910 spin. Here, multiple reel outcomes are determined, and are displayed if one or more of the possible outcomes include an improved award.

The feature could be applied to free spins or free games, where the player could pick from multiple draws before each free game reels spin. For example, bonus game awards free games. Prior to each free game, multiple draws could be run containing a winning spin, and then the player could pick between multiple draws containing the winning combination. This process could occur on any or all of the free games presented to the player.

As described above, the features described herein may be applied to any game of chance, bonus game, etc. For example, the features described herein may be used in connection with a game that involves identifying award-enhancing opportunities using an actual or virtual die/dice, and enabling repetition of such award-enhancing opportunities based on the die/dice results until a terminating event occurs using the die/dice, such as described in U.S. patent application Ser. No. 12/850,826. For example, one representative method using such die/dice is used in connection with a gaming event, such as a slot game where payouts are provided for certain matching symbols in a symbol display grid. A die/dice is presented, and award-enhancing opportunities are identified in response to the die/dice "roll" or other presentation. In such an embodiment, the die/dice presentation and corresponding award-enhancing opportunities are allowed to repeat, thereby aggregating award-enhancing opportunities, until the die/dice provide a result that triggers the end of the award-enhancing opportunities. In this manner, payout opportunities are enhanced in the original gaming event. The features described herein may be used in connection with such a game of chance. For example, in a game involving the die/dice feature described above (hereinafter referred to as "dice game"), the player may be rolling for dice awards, where the act of rolling a "7" on the (actual or virtual) dice ends the dice rolling event. The feature of the present disclosure may be used to allow the player pick in an attempt to avoid the "7" and/or give them a choice to pick the result of the roll.

In another embodiment associated with such a dice game, before each roll, two (or more) actual roll outcomes could be conducted by the processor and/or other random number generation circuitry, where if each of the generated outcomes results in a "7," the dice game event ends and a "7" is shown on the roll. If both outcomes are not "7," the player may be given one of the results without divulging the other outcome or that the feature occurred. If one roll results in a "7" but the other does not, the player could be presented with a selection, as described herein, in an attempt to avoid rolling the terminating "7."

For example, assume in such a dice game that it is determined that the result of the next roll is going to be a "7." Multiple outcomes are conducted, such as by generating two or more alternative results, where at least one of the outcomes is not a "7." The player may be given the opportunity to select from the set that contains one or more "7" rolls and one or more rolls that are not "7." The player is then prompted to pick from this set in order to avoid the "7" roll. In one embodiment, the player could wager a bonus bet to be eligible for the opportunity to get a pick at some times, or in other embodiments every time, it is determined that the result of the next roll is going to be a 7.

Yet another variation is that prior to each roll, multiple runs are drawn behind the scenes. Each result in the run could be presented to the player, who is then prompted to pick one item from the set to determine the outcome of their roll. For example, before the roll, five outcomes may be determined. Each outcome is associated to a draw (i.e. selection). The draws are presented to the player to pick from the available displayed options.

In these embodiments, if the player picks Draw 2 (resulting in a 7) the dice rolling feature would end. If the player picked any other draw other than Draw 2 in this example, he/she would continue to play the dice roll game, barring any other criteria such as maximum number of allowed rolls in the game, etc.

Furthermore, the player could opt to, or be forced to, roll one die, and then multiple runs are conducted for the second die. The player then could be prompted to pick from the set results of the second die to determine the final dice outcome.

In electronic embodiments, multiple hands may be played concurrently. For example, multiple initial draw poker hands may be presented for play. In another embodiment, multiple hands may be played where any held cards from one hand are replicated as held cards in the other played hands. The player may be required to pay additional wagers to play the additional hands concurrently, or it may be part of the standard wager, or a bonus event, etc.

Figure 10:
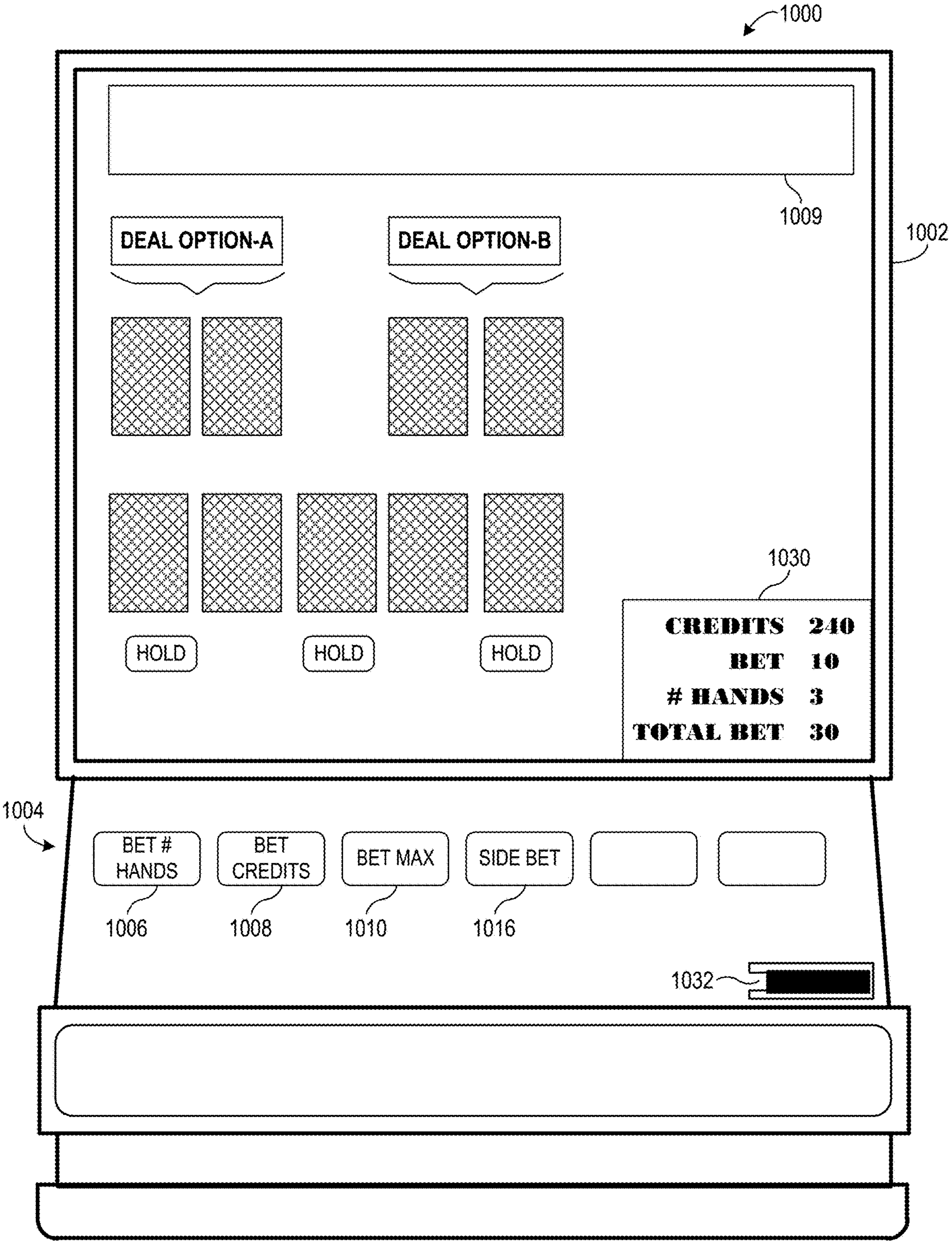
FIG. 10 is a diagram of a gaming machine according to embodiments of the invention.

The features described herein may be used in connection with video poker machines, slot machines, computing devices and/or other gaming devices. FIG. 10 illustrates a representative embodiment of a casino-style gaming device in which the principles of the invention may be applied. For purposes of explanation, the description of the gaming device is FIG. 10 is provided in terms of a kiosk, slot machine, or video poker machine 1000. However, the features described herein are analogously applicable to other computer-based systems.

The illustrated gaming machine 1000 includes a computing system (not shown) to carry out operations according to the disclosure. The illustrated gaming machine 1000 includes a display 1002, and a user interface 1004, although some or all of the user interface may be provided via the display 1002 in touch screen embodiments. The user interface 1004 allows the user to control and engage in play of the gaming machine 1000. The particular user interface mechanisms associated with user interface 1004 is dependent on the type of gaming machine. For example, the user interface 1004 may include one or more buttons, switches, joysticks, levers, pull-down handles, trackballs, voice-activated input, or any other user input system or mechanism that allows the user to play the particular gaming activity. The user interface 1004 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/token input mechanisms, card readers, credit card readers, smart card readers, punch card readers, and other mechanisms may be used to enter wagers. It is through the user interface 1004 that the user can initiate and engage in a gaming activity implementing the features described herein. For example, the user can use the user interface 1004 and/or touch screen inputs to place wagers 1008, 1010, hold cards 1011, select from multiple outcomes and make other gaming decisions, place side bets 1016 that in some embodiments will make the user eligible for features described herein, and the like. While the illustrated embodiment depicts various buttons for the user interface 1004, it should be recognized that a wide variety of user interface options are available for use in connection with the described features, including pressing buttons, touching a segment of a touch-screen, entering text, entering voice commands, or other known user entry methodology.

The display device 1002 may include one or more of an electronic display, a mechanical display, and fixed display information such as information such as paytable information associated with a glass/plastic panel 1009 on the gaming machine 1000. A display segment or panel 1030 may also be provided to display information such as the accumulated credits, current bet amount such as "10" credits (where credits may represent, for example, coins, tokens, dollars, etc.), the number of hands played, total bet, the number of credits paid out or "won" on a particular play, etc. A wager acceptor 1032 is operative to receive wager tokens, coins, bills, credit/debit cards, coupons, smart cards, prepaid casino cards, electronic fund transfer (EFT), tickets, and the like.

Figure 11:
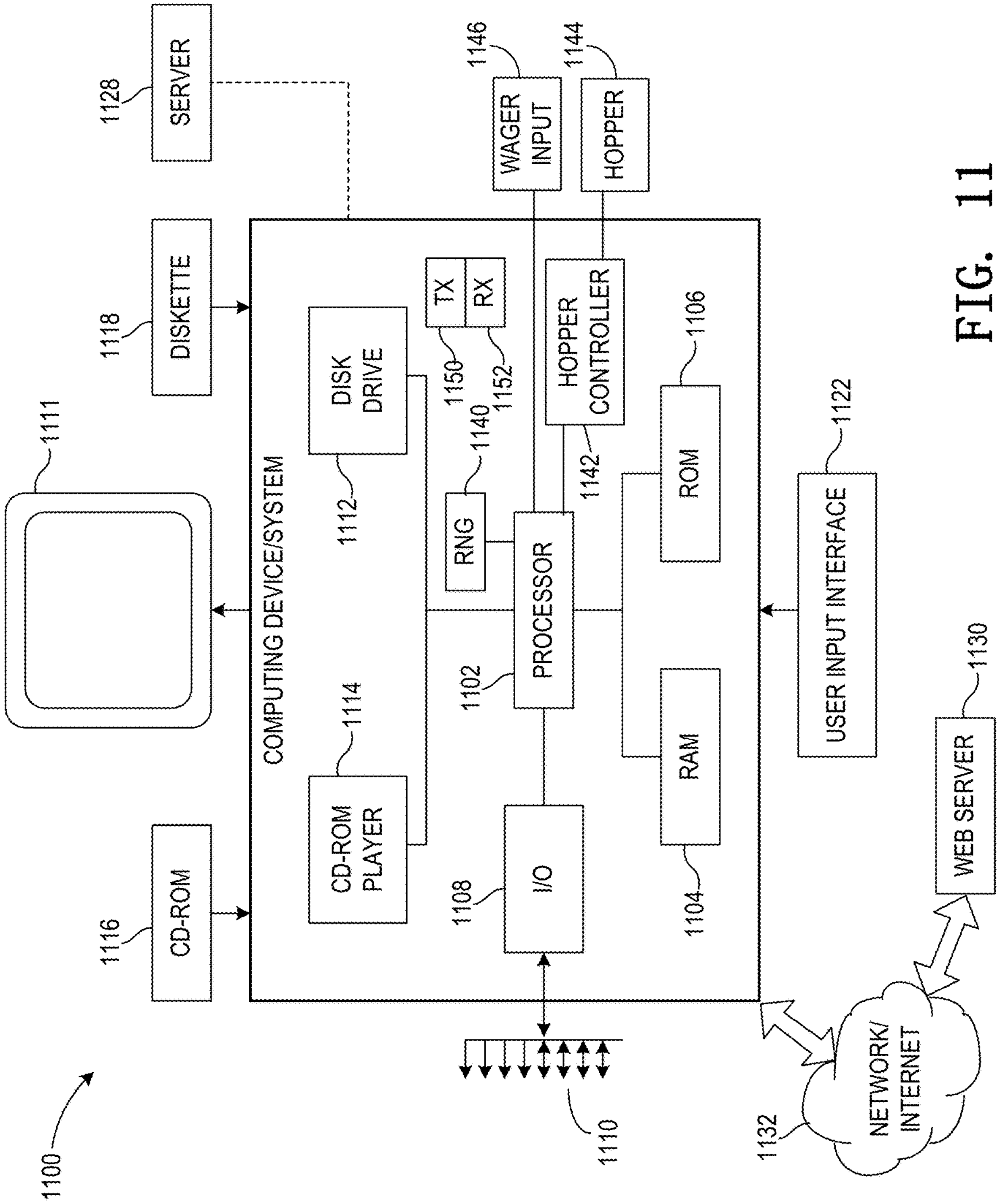
FIG. 11 is a block diagram illustrating a computing arrangement according to embodiments of the invention.

As may now be readily understood, the device 1000 may be programmed to facilitate the various embodiments described herein. The gaming activities and features described herein may be implemented as a casino gaming machine, such as a video poker machine or other special purpose gaming kiosk as described in FIG. 10, or may be implemented via computing systems operating under the direction of local gaming software, and/or remotely-provided software such as provided by an application service provider (ASP). The casino gaming machine may utilize a computing system to control and manage the gaming activity. An example of a representative computing system capable of carrying out operations described herein is illustrated in FIG. 11.

Hardware, firmware, software or a combination thereof may be used to perform the various gaming functions, display presentations and operations described herein. The functional modules used in connection with the features described herein may reside in a gaming machine as described, or may alternatively reside on a stand-alone or networked computing device/system. The computing structure 1100 of FIG. 11 is an exemplary computing structure that can be used in connection with such electronic gaming machines, computers, or other computer-implemented devices to carry out operations described herein. It should be noted that the representative computing structure of FIG. 11 or analogous computing structure may be used on a local computer, kiosk, server, or any other device providing or serving the gaming functions. It should also be noted that the computing arrangement of FIG. 11 may be distributed across multiple devices (e.g., processing components at a server, and display and user interface components at a local gaming machine, etc.).

The example computing arrangement 1100 suitable for performing the gaming features described herein typically includes a central processor (CPU) 1102 coupled to random access memory (RAM) 1104 and some variation of read-only memory (ROM) 1106. The ROM 1106 may also represent other types of storage media to store programs, such as programmable ROM (PROM), erasable PROM (EPROM), etc. The processor 1102 may communicate with other internal and external components through input/output (I/O) circuitry 1108 and bussing 1110, to provide control signals, communication signals, and the like.

Chance-based gaming systems such as video poker machines, in which the present invention is applicable, are governed by random numbers and processors. A display device 1111 is used to display the gaming activity as facilitated by one or more random number generators (RNG). RNGs are well-known in the art, and may be implemented using hardware, software operable in connection with the processor 1102, or some combination of hardware and software. The present invention is operable using any known RNG, and may be integrally programmed as part of the processor 1102 operation, or alternatively may be a separate RNG controller 1140.

The computing arrangement 1100 may also include one or more data storage devices, including hard and floppy disk drives 1112, CD-ROM drives 1114, and other hardware capable of reading and/or storing information such as DVD, FLASH drives, etc. In one embodiment, software for carrying out the operations in accordance with the invention may be stored and distributed on a CD-ROM 1116, diskette 1118, DVD, FLASH device or other form of media capable of portably storing information. These storage media may be inserted into, and read by, devices such as the CD-ROM drive 1114, the disk drive 1112, etc. The software may also be transmitted to the computing arrangement 1100 via data signals, such as being downloaded electronically via a network, such as the Internet. Further, as previously described, the software for carrying out the functions described herein may alternatively be stored in internal memory/storage of the computing device 1100, such as in the ROM 1106 or other storage.

The computing arrangement 1100 is coupled to the display 1111, which represents a display on which the gaming activities are presented. The display 1111 may be any type of known display or presentation screen, such as LCD displays, plasma display, cathode ray tubes (CRT), etc. Where the computing device 1100 represents a stand-alone or networked computer, the display 1111 may represent a standard computer terminal or display capable of displaying multiple windows, frames, etc. Where the computing device is embedded within an electronic gaming machine (see FIG. 8), the display 1111 corresponds to the display screen of the gaming machine/kiosk. A user input interface 1122 such as a mouse, buttons, keyboard/keypad, microphone, touch pad, trackball, joystick, touch screen, voice-recognition system, etc. may be provided.

The computing arrangement 1100 may be connected to other computing devices or gaming machines, such as via a network. The computing arrangement 1100 may be connected to a network server 1128 in an intranet or local network configuration. The computer may further be part of a larger network configuration as in a global area network (GAN) such as the Internet. In such a case, the computer accesses one or more web servers 1130 via the network/Internet 1132.

Other components directed to gaming machine implementations include manners of gaming participant payment, and gaming machine payout. For example, a gaming machine including the computing arrangement 1100 may also include a hopper controller 1142 to determine the amount of payout to be provided to the participant. The hopper controller may be integrally implemented with the processor 1102, or alternatively as a separate hopper controller 1142. A hopper 1144 may also be provided in gaming machine embodiments, where the hopper serves as the mechanism holding the coins/tokens of the machine. The wager input module 1146 represents any mechanism for accepting coins, tokens, coupons, bills, electronic fund transfer (EFT), tickets, credit cards, smart cards, membership cards, etc., for which a participant inputs a wager amount.

Additionally, the computing arrangement 1100 may include a transmitter (TX) 1150, and may include a receiver (RX) 1152. These TX 1150 and RX 1152 components may be discrete components, or aggregated such as in the case of a transceiver. The receiver function provided by the RX 1152 can be configured to receive information from any type of network, such as a local area network (LAN), wireless LAN (e.g., 802.11 a/b/g), wired network (e.g., Internet), wireless network (e.g., Global System for Mobile Communications/General Packet Radio Service (GSM/GPRS), proximity networks (e.g., Bluetooth, peer-to-peer networks), and/or other wired/wireless network technologies. For example, the RX 1152 may receive programming and/or operational information from a server 1128 or 1130 where the system is server-based. Any such server may include computing components analogous to those depicted in FIG. 11. Information such as wager information or other data used by a server can be provided to the appropriate server 1128, 1130 or other device or network entity via the TX 1150.

It should also be recognized that the computing arrangement 1100 of FIG. 11 may be implemented in a gaming apparatus, or in a server or other network entity that determines and provides multi-outcome card features in accordance with the disclosure.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A video poker gaming device comprising:
- a gaming machine body;
- a video display device mount in the game machine body, the video display device configured to display a plurality of card positions;
- a player interface attached to the gaming machine body, the player interface including a plurality of mechanical buttons;
- a wager input device attached to the gaming machine body, the wager input device structured to receive a physical item associated with currency, the physical item establishing a credit balance, the credit balance being increasable or decreasable based at least on wagering activity;
- a memory housed in the gaming machine body, the memory configured to store the credit balance, a plurality of virtual playing cards, and a paytable; and
- a processor housed in the game machine body and connected to the video display device, player interface, wager input device, and memory, the processor configured to:
  - receive a signal from the player interface to initiate a poker game in response to placement of a wager, the wager decreasing the credit balance;
  - determine a plurality of possible game outcomes with the processor;
  - determine if one or more of the plurality of possible game outcomes satisfies a predefined condition with the processor prior to displaying any cards associated with the determined game outcomes;
  - if it is determined that one or more of the plurality of possible game outcomes satisfies the predefined condition:
    - display a plurality of selectable poker hands on the video display device,
    - receive a signal indicating selection of one of the poker hands,
    - evaluate the selected poker hand using the paytable stored in the memory to determine if the combination of cards in the selected poker hand is associated with an award, and
    - increase the credit balance stored in the memory by an amount of any award determined in the evaluation of the selected poker hand; and
  - if it is determined that none of the plurality of possible game outcomes satisfy the predefined condition:
    - display a single poker hand on the video display device,
    - evaluate the single poker hand using the paytable stored in the memory to determine if the combination of cards in the single poker hand is associated with an award, and
    - increase the credit balance stored in the memory by an amount of any award determined in the evaluation of the single poker hand.

2. The video poker gaming device of claim 1, wherein the predefined condition is associated with the amount of the wager placed.

3. The video poker gaming device of claim 1, wherein determine the plurality of possible game outcomes includes generating a plurality of dealt poker hands and evaluating the plurality of dealt poker hands to determine if any of the generated dealt poker hands satisfies a threshold poker hand, where the threshold poker hand is used as the predefined condition.

4. The video poker gaming device of claim 3, where the threshold poker hand is a winning poker hand associated with an award in the paytable stored in the memory.

5. The video poker gaming device of claim 3, where the threshold poker hand is a poker hand with at least two cards of the same rank.

6. The video poker gaming device of claim 1, where the plurality of selectable poker hands are displayed on the video display device face down.

7. A video poker gaming device comprising:
- a gaming machine body;
- a video display device mount in the game machine body, the video display device configured to display a plurality of card positions;
- a player interface attached to the gaming machine body, the player interface including a plurality of mechanical buttons;
- a wager input device attached to the gaming machine body, the wager input device structured to receive a physical item associated with currency, the physical item establishing a credit balance, the credit balance being increasable or decreasable based at least on wagering activity;
- a memory housed in the gaming machine body, the memory configured to store the credit balance, a plurality of virtual playing cards, and a paytable; and
- a processor housed in the game machine body and connected to the video display device, player interface, wager input device, and memory, the processor configured to:
  - receive a signal from the player interface to initiate a poker game in response to placement of a wager, the wager decreasing the credit balance;
  - determine a first possible game outcome with the processor;
  - determine if the first possible game outcome satisfies a predefined condition with the processor prior to displaying any cards associated with the determined first possible game outcome;
  - if it is determined that the first possible game outcome satisfies the predefined condition:
    - display the first possible game outcome as a first poker hand,
    - evaluate the first poker hand using the paytable stored in the memory to determine if the combination of cards in the first poker hand is associated with an award, and
    - increase the credit balance stored in the memory by an amount of any award determined in the evaluation of the first poker hand; and
  - if it is determined that first possible game outcome does not satisfy the predefined condition:
    - determine a second possible game outcome,
    - display the first possible game outcome face down as a first selectable poker hand,
    - display the second possible game outcome face down as a second selectable poker hand, receive a signal indicating a selection of either the first selectable poker hand or the second selectable poker hand, display the selected one of the poker hands face up as a selected poker hand, evaluate the selected poker hand using the paytable stored in the memory to determine if the combination of cards in the selected poker hand is associated with an award, and increase the credit balance stored in the memory by an amount of any award determined in the evaluation of the selected poker hand.

8. The video poker gaming device of claim 7, wherein determining if the first possible game outcome satisfies a predefined condition includes evaluating the first possible game outcome to determine if the first possible game outcome satisfies a threshold poker hand, where the threshold poker hand is used as the predefined condition.

9. The video poker gaming device of claim 8, where the threshold poker hand is a winning poker hand associated with an award in the paytable.

10. The video poker gaming device of claim 8, where the threshold poker hand is a poker hand with at least two cards of the same rank.

11. The video poker gaming device of claim 8, where the threshold poker hand is a selected one of a plurality of player-selectable types of poker hands.

12. The video poker gaming device of claim 7, wherein the processor is further configured to display the non-selected one of the poker hands face up when it is determined that first possible game outcome does not satisfy the predefined condition.

13. A video poker gaming device comprising:

a gaming machine body;

a video display device mount in the game machine body, the video display device configured to display a plurality of card positions;

a player interface attached to the gaming machine body, the player interface including a plurality of mechanical buttons;

a wager input device attached to the gaming machine body, the wager input device structured to receive a physical item associated with currency, the physical item establishing a credit balance, the credit balance being increasable or decreasable based at least on wagering activity;

a memory housed in the gaming machine body, the memory configured to store the credit balance, a plurality of virtual playing cards, and a paytable; and a processor housed in the game machine body and connected to the video display device, player interface, wager input device, and memory, the processor configured to:

receive a signal from the player interface to initiate a poker game in response to placement of a wager, the wager decreasing the credit balance;

determine a first possible game outcome and a second possible game outcome with the processor;

determine if either the first possible game outcome or the second possible game outcome satisfies a predefined condition with the processor prior to displaying any dealt cards;

if it is determined that one of the first possible game outcome or the second possible game outcome satisfies the predefined condition:

display the first possible game outcome face down as a first dealt poker hand, display the second possible game outcome face down as a second dealt poker hand, receive a signal indicating a selection of either the first dealt poker hand or the second dealt poker hand as a selected dealt poker hand, display the selected dealt poker hand face up on the video display, receive signals indicating cards to be held in the selected dealt poker hand, and provide replacement cards for any cards not held in the selected dealt poker hand to display a final poker hand on the video display device;

if it is determined that neither first possible game outcome nor the second possible game outcome satisfies the predefined condition:

display the first possible game outcome face up as a single dealt poker hand, receive signals indicating cards to be held in the single dealt poker hand, and provide replacement cards for any cards not held in the single dealt poker hand to display a final poker hand on the video display device;

evaluate the final poker hand using a paytable stored in the memory to determine if the combination of cards in the final poker hand is associated with an award; and increase the credit balance stored in the memory by an amount of any award determined in the evaluation of the final poker hand.

14. The video poker gaming device of claim 13, wherein determining if either the first possible game outcome or the second possible game outcome satisfies a predefined condition includes evaluating the first possible game outcome and the second possible game outcome to determine if either the first possible game outcome or the second possible game outcome satisfies a threshold poker hand, where the threshold poker hand is used as the predefined condition.

15. The video poker gaming device of claim 14, where the threshold poker hand is a winning poker hand associated with an award in a paytable.

16. The video poker gaming device of claim 14, where the threshold poker hand is a dealt poker hand with at least two cards of the same rank.

17. The video poker gaming device of claim 14, where the threshold poker hand is a selected one of a plurality of player-selectable types of poker hands.

18. The video poker gaming device of claim 13, wherein the processor is further configured to display the non-selected one of the first dealt poker hand or the second dealt poker hand face up on the video display when displaying the selected dealt poker hand.

* * * * *